United States Patent
Misu et al.

(10) Patent No.: US 6,662,891 B2
(45) Date of Patent: Dec. 16, 2003

(54) VEHICLE POWER SOURCE DEVICE WHEREIN COOLING AIR IS INTRODUCED INTO BATTERY CASING THROUGH OPENING FORMED THROUGH VEHICLE FLOOR

(75) Inventors: Masahiro Misu, Nissin (JP); Keiji Shukuya, Nagoya (JP); Yurio Hatta, Toyota (JP); Yuji Tanigawa, Nissin (JP); Hideto Minekawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 74 days.

(21) Appl. No.: 09/824,109

(22) Filed: Apr. 3, 2001

(65) Prior Publication Data

US 2001/0030069 A1 Oct. 18, 2001

(30) Foreign Application Priority Data

Apr. 13, 2000 (JP) .......................... 2000-112045
Dec. 26, 2000 (JP) .......................... 2000-395650

(51) Int. Cl.$^7$ .............................. B60K 11/06; B60K 1/04
(52) U.S. Cl. ..................... 180/68.1; 180/68.5; 180/65.1
(58) Field of Search .................... 180/68.1, 68.2, 180/68.5, 65.1; 429/99

(56) References Cited

U.S. PATENT DOCUMENTS

| | | | | |
|---|---|---|---|---|
| 5,390,754 A | * | 2/1995 | Masuyama et al. | 180/68.5 |
| 5,392,873 A | * | 2/1995 | Masuyama et al. | 180/68.5 |
| 5,490,572 A | * | 2/1996 | Tajiri et al. | 180/65.1 |
| 5,534,364 A | * | 7/1996 | Watanabe et al. | 180/65.5 |
| 5,641,031 A | * | 6/1997 | Riemer et al. | 180/65.3 |
| 5,937,664 A | * | 8/1999 | Matsuno et al. | 62/259.2 |
| 6,029,762 A | * | 2/2000 | Kepner | 180/65.1 |
| 6,094,927 A | * | 8/2000 | Anazawa et al. | 62/239 |
| 6,188,574 B1 | * | 2/2001 | Anazawa | 361/695 |
| 6,189,636 B1 | * | 2/2001 | Kikukawa | 180/68.5 |
| 6,315,069 B1 | * | 11/2001 | Suba et al. | 180/68.5 |
| 6,378,637 B1 | * | 4/2002 | Ono et al. | 180/65.3 |
| 6,394,210 B2 | * | 5/2002 | Matsuda et al. | 180/68.1 |
| 6,443,253 B1 | * | 9/2002 | Whitehead et al. | 180/68.1 |
| 6,541,151 B2 | * | 4/2003 | Minamiura et al. | 429/98 |
| 6,541,154 B2 | * | 4/2003 | Oogami et al. | 429/159 |

FOREIGN PATENT DOCUMENTS

| | | |
|---|---|---|
| JP | 5-193370 | 8/1993 |
| JP | 5-193376 | 8/1993 |
| JP | 7-323735 | 12/1995 |
| JP | 10-252467 | 9/1998 |

\* cited by examiner

Primary Examiner—Brian L. Johnson
Assistant Examiner—Jeffrey Restifo
(74) Attorney, Agent, or Firm—Oblon, Spivak, McClelland, Maier & Neustadt, P.C.

(57) ABSTRACT

An electric power source device including a plurality of battery cells accommodated within a battery casing installed on an automotive vehicle, such that the battery cells are cooled air introduced from a compartment of the vehicle into the battery casing, wherein the battery casing is disposed adjacent to the vehicle compartment and is generally isolated from the compartment by a floor or covering member which partially defines the compartment or covers the battery casing, and the floor or covering member has an inlet of an air intake passage, through which the air is introduced into the battery casing, for cooling the battery cells.

20 Claims, 17 Drawing Sheets

32

VEHICLE POWER SOURCE DEVICE WHEREIN COOLING AIR IS INTRODUCED INTO BATTERY CASING THROUGH OPENING FORMED THROUGH VEHICLE FLOOR

This application is based on Japanese Patent Application Nos. 2000-112045 filed Apr. 13, 2000 and 2000-395650 filed Dec. 26, 2000, the contents of which are incorporated hereinto by reference.

BACKGROUND OF THE INVENTION

1. Field of the Invention

The present invention relates to an electric power source device which is installed on a vehicle such that the power source device is cooled with air within the interior space or compartment of the vehicle.

2. Discussion of Related Art

There is known an electric power source device of a comparatively large capacity for an automotive vehicle such as an electric or hybrid vehicle, which power source device is a battery pack fixed on a floor of the vehicle and arranged to be cooled by utilizing air within the vehicle interior space. In this type of electric power source device, there are provided gaps between adjacent ones of a plurality of battery cells of the battery pack so that air introduced from the vehicle interior space flows through the gaps in one direction. An example of the electric power source device of this type for an electric vehicle is disclosed in JP-A-10-252467. In the power source device disclosed in this publication, the battery cells are accommodated within a battery casing which communicates with an air duct open downwards below the rear window of the vehicle, and the air is admitted into the air duct, at a position below the rear window, so that the air introduced into the battery casing through the air duct is circulated through the gaps between the adjacent battery cells, whereby the battery cells are cooled with the air.

In the electric power source device disclosed in the above-identified publication wherein the open end of the air duct for cooling the battery cells is located below the rear window of the vehicle, the length of the air duct and the corresponding distance of flow of the air through the air duct tend to be relatively large, causing a relatively high resistance to a flow of the air through the air duct toward the battery housing, so that the effect of cooling the battery cells tends to be insufficient.

SUMMARY OF THE INVENTION

It is therefore an object of the present invention to provide an electric power source device for an automotive vehicle, wherein a resistance to a flow of cooling air to a battery pack is relatively low.

The above object may be achieved according to any one of the following modes or forms of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) An electric power source device including a plurality of battery cells accommodated within a battery casing installed on an automotive vehicle, such that the battery cells are cooled by air introduced from a compartment of the vehicle into the battery casing, wherein the battery casing is disposed adjacent to the compartment of the vehicle and is generally isolated from the compartment by a floor which partially defines the compartment, and the floor has an inlet of an air intake passage through which the air is introduced into the battery casing, for cooling the plurality of battery cells.

In the electric power source device constructed according to the above mode (1) of this invention, the battery casing is disposed adjacent to the vehicle compartment and is generally isolated by the floor from the vehicle compartment. The floor has the inlet of the air intake passage through which the air is introduced from the vehicle compartment into the battery casing, to cool the battery cells within the battery casing. This arrangement is effective to shorten the required length of the air intake passage between the inlet and the battery casing, permitting significant reduction of a resistance to a flow of the cooling air through the air intake passage, and thereby assuring an accordingly increased effect of cooling of the battery cells. electric power source device is available at an accordingly reduced cost.

(3) An electric power source device including a plurality of battery cells accommodated within a battery casing installed on an automotive vehicle, such that the battery cells are cooled by air introduced from a compartment of the vehicle into the battery casing through an intake air passage, wherein the battery casing is accommodated within an interior space whose upper wall is defined by a floor of the vehicle, and the upper wall has an inlet of an air intake passage through which the air is introduced into the battery casing.

In the electric power source device constructed according to the above mode (3) of this invention, the battery casing is disposed adjacent to the vehicle compartment and is generally isoalted by the vehicle floor from the vehicle compartment. Namely, the battery casing is accommodated within the interior space whose upper wall is defined by a portion of the vehicle floor. The upper wall space has the inlet of the air intake passage through which the air is introduced from the vehicle compartment into the battery casing, to cool the battery cells within the battery casing. This arrangement is effective to shorten the required length of the air intake passage between the inlet and the battery casing, permitting significant reduction of a resistance to a flow of the cooling air through the air intake passage, and thereby assuring an accordingly increased effect of cooling of the battery cells. Further, the required lengths of components which define the air intake passage, for instance, the (2) An electric power source device including a plurality of battery cells accommodated within a battery casing installed on an automotive vehicle, such that the battery cells are cooled by air introduced from a compartment of the vehicle into the battery casing through an intake air passage, wherein the battery casing is disposed adjacent to the compartment of the vehicle and is generally isolated from the compartment by a covering member which is disposed within a body shell of the vehicle so as to cover the battery casing, and the covering member has an inlet of the air intake passage, through which the air is introduced into the battery casing.

In the electric power source device constructed according to the above mode (2) of this invention, the battery casing is disposed adjacent to the vehicle compartment and is generally isolated by the covering member from the vehicle compartment. The covering member has the inlet of the air intake passage through which the air is introduced from the vehicle compartment into the battery casing, to cool the battery cells within the battery casing. This arrangement is effective to shorten the required length of the air intake passage between the inlet and the battery casing, permitting significant reduction of a resistance to a flow of the cooling air through the air intake passage, and thereby assuring an accordingly increased effect of cooling of the battery cells. Further, the required lengths of components which define the air intake passage, for instance, the required length of an air intake duct, can be reduced, so that the components are available at accordingly reduced costs, and the required length of an air intake duct, can be reduced, so that the components are available at accordingly reduced costs, and the electric power source device is available at an accordingly reduced cost.

(4) An electric power source device according to any one of the above modes (1)–(3), wherein the inlet is provided under a seat disposed in the compartment of the vehicle.

According to the above mode (4) of the invention, the inlet of the air intake passage is generally covered by the seat, so that a noise due to the flow of the air through the air intake passage is less likely to be heard within the vehicle compartment.

(5) An electric power source device according to any one of the above modes (1)–(4), wherein the air intake passage is a generally curved passage including a first straight segment extending substantially downwards from the inlet, a second straight segment extending substantially horizontally, and a curved segment which extends between the first and second straight segments, the generally curved passage being partially defined by a curved shielding plate which is fixed at a position on an inner side of a curve of the generally curved passage.

In the electric power source device according to the above mode (5), the air is introduced from the vehicle compartment into the battery casing through the generally curved air intake passage, which is partially defined by the curved shielding plate. This arrangement prevents entry of foreign matters from the vehicle compartment into the battery casing, even if the foreign matters are introduced together with the air into the first straight segment of the passage, which first segment extends substantially downwards from the inlet of the passage. That is, the curved segment of the curved air intake passage partially defined by the curved shielding plate does not permit a movement of the foreign matters into the second straight portion extending substantially horizontally toward the battery casing located downstream of the shielding plate. The foreign matters may include liquid substances spilt within the vehicle compartment. Further, the shielding plate prevents passengers within the vehicle compartment from seeing the battery casing through the air intake passage. In other words, the shielding plate conveniently hides the battery casing, which would deteriorate the appearance of the interior of the vehicle.

(6) An electric power source device according to any one of the above modes (1)–(5) further including a blower fan which constitutes a part of the air intake passage and which is operable to blow the air into the battery casing, and a shielding plate which partially defines said air intake passage such that said air intake passage is generally curved, so as to prevent a flow of the air from the inlet of the air intake passage directly into an inlet of the blower fan.

In the electric power source device according to the above mode (6), the air introduced from the vehicle compartment into the air intake passage is blown into the battery casing by the blower fan, and the shielding plate is provided to partially define the air intake passage such that the air intake passage is generally curved so as to prevent the air flow directly into the battery casing. This arrangement prevents entry of foreign matters from the vehicle compartment into the blower fan, even if the foreign matters are introduced together with the air into the generally curved air intake passage. That is, the shielding plate which defines the generally curved air intake passage does not permit a movement of the foreign matters into the battery casing located downstream of the shielding plate. The foreign matters may include liquid substances spilt within the vehicle compartment. Further, the shielding plate prevents passengers within the vehicle compartment from seeing the blower fan through the air intake passage. In other words, the shielding plate conveniently hides the blower fan, which would deteriorate the appearance of the interior of the vehicle. In addition, the shielding plate prevents propagation of the operating noise of the blower fan into the vehicle compartment, thereby reducing the discomfort of the vehicle passengers due to the operating noise.

(7) An electric power source device according to the above mode (5) or (6), wherein the shielding plate includes a distal end portion which is turned on an inner side of a curve of the air intake passage, the inlet of the air intake passage being located on an outer side of the curve.

The shielding plate in the above mode (7) is effective to reduce the frictional resistance of its distal end portion to the air flow, and accordingly reduce the deceleration of the air stream at the distal end portion, permitting an increased effect of cooling of the battery cells.

(8) An electric power source device including a battery module disposed under a seat of an automotive vehicle, such that said battery module is cooled by air introduced through an air intake passage, the battery module consisting of a plurality of battery cells superposed on each other in a stack, wherein the seat has a lower surface defining an under-seat space which is held in communication with a compartment of the vehicle, and the air intake passage has an inlet which is held in communication with the under-seat space, so that the air for cooling the battery module is introduced from the compartment into the air intake passage through the under-seat space and the inlet.

In the electric power source device constructed according to the above mode (8) of this invention, the inlet of the air intake passage is held in communication with the under-seat space which is partially defined by the lower surface of the vehicle seat and which is held in communication with the vehicle compartment, so that the air for cooling the battery module is introduced into the air intake passage through the under-seat space and the inlet. According to this arrangement, the required length of the air intake passage for introducing the air for cooling the battery module disposed under the vehicle seat can be significantly reduced, so that the resistance to the air flow through the air intake passage can be accordingly reduced. Further, the inlet of the air intake passage and the under-seat space in communication with that inlet are almost covered by the vehicle seat. This arrangement utilizes an otherwise dead space under the vehicle seat, and permits reduction of the noise of the air flow as heard within the vehicle compartment, as compared with an arrangement in which the inlet of the air intake passage is formed through a front wall of a structure on which the seat is mounted and in which the battery module is accommodated.

(9) An electric power source device including a battery module accommodated within an interior space partially defined by an under-seat covering panel on which a seat of an automotive vehicle is mounted, the battery module being cooled by air introduced through an air intake passage, the battery module consisting of a plurality of battery cells superposed on each other in a stack, wherein the under-seat covering panel cooperates with a lower surface of the seat to define therebetween an under-seat space which extends in a lateral direction of the vehicle and which has an opening in the form of a generally elongate slot, the under-seat space communicating through the opening with a portion of a compartment of the vehicle which portion is located in front of the seat, and the air intake passage has an inlet in communication with the under-seat space.

In the electric power source device constructed according to the above mode (9) of this invention, the under-seat space is defined between the under-seat covering panel and the lower surface of the vehicle seat. This under-seat space has the opening in the form of a generally elongate slot through which the under-seat space is held in communication with the vehicle compartment and the inlet of the air intake passage. In this arrangement, the air is introduced from the vehicle compartment into the inlet of the air intake passage through the under-seat space. According to this arrangement, the required length of the air intake passage for introducing the air for cooling the battery module disposed under the vehicle seat can be significantly reduced, and the resistance to the air flow through the intake air passage can be accordingly reduced. Further, the under-seat space in communication with the vehicle compartment is almost covered by the vehicle seat. This arrangement utilizes an otherwise dead space under the vehicle seat, and permits reduction of the noise of the air flow as heard within the vehicle compartment, as compared with an arrangement in which the inlet of the air intake passage is formed through a front wall of the under-seat covering panel, which front wall is located right below the front end of the vehicle seat.

(10) An electric power source device according to the above mode (8) or (9), wherein the battery cells of the battery module are superposed on each other in a direction of each battery cell so as to form an elongate stack, such that gaps are formed between adjacent ones of the battery cells, so as to extend in one direction perpendicular to a longitudinal direction of said elongate stack, and the seat of the vehicle is a bench disposed so as to extend in a lateral direction of the vehicle. In this case, the battery module is disposed under the bench such that the longitudinal direction of the elongate stack is parallel to the lateral direction of the vehicle. In the present arrangement, the air introduced through the air intake passage is fed to flow through the gaps between the adjacent battery cells in the predetermined direction, so that the battery cells superposed on each other in their thickness direction can be effectively cooled by the air flowing through the gaps, and the service life of the battery cells can be prolonged.

(11) An electric power source device according to the above mode (10), wherein the battery module is accommodated within a battery casing such that the battery casing and the battery module cooperate to define an air intake chamber and an air exhaust chamber on opposite sides of said battery module, such that the air intake chamber communicates with the air intake passage, while the air exhaust chamber communicates with an air exhaust passage provided with a blower fan. When blower fan is operated, the air is drawn from the air intake passage into the air exhaust passage through the air intake chamber, the above-indicated gaps between the battery cells, and the air exhaust chamber, which are formed within the battery casing. Thus, the battery module is effectively cooled, and the service life of the battery module is prolonged.

(12) An electric power source device according to the above mode (10), wherein the battery module is accommodated within a battery casing such that the battery casing and the battery module cooperate to define an air intake chamber and an air exhaust chamber on opposite sides of said battery module, such that the air intake chamber communicates with the air intake passage provided with a blower fan, while the air exhaust chamber communicates with an air exhaust passage. When blower fan is operated, the air introduced into the air intake passage is forced to flow through the air intake chamber, the above-indicated gaps between the battery cells, and the air exhaust chamber, which are formed within the battery casing. Thus, the battery module is effectively cooled, and the service life of the battery module is prolonged. In this arrangement wherein the blower fan 31 connected to the air intake passage is operated to blow the air into the air intake chamber through the air intake passage, the pressure in the air intake chamber tends to be higher than the atmospheric pressure outside the battery casing, so that the comparatively hot air outside the battery casing is prevented from entering the battery casing. The entry of the hot air into the battery casing would cause an undesirable temperature gradient in the direction of thickness of the battery cells, which may cause a variation in the properties of the battery cells due to the temperature gradient. The present arrangement is effective to reduce the above-indicated temperature gradient and property variation of the battery cell.

(13) An electric power source device according to the above mode (11) or (12), wherein said air exhaust passage is held in communication with an exterior space of the vehicle. According to this arrangement, the air whose temperature has been raised after as a result of its flow through the gaps between the battery cells is discharged into the exterior of the vehicle, so that the temperature rise of the air in a space in which the battery casing is accommodated can be effectively reduced.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Referring the accompanying drawings, several presently preferred embodiments of this invention will be described in detail.

Figure 1:
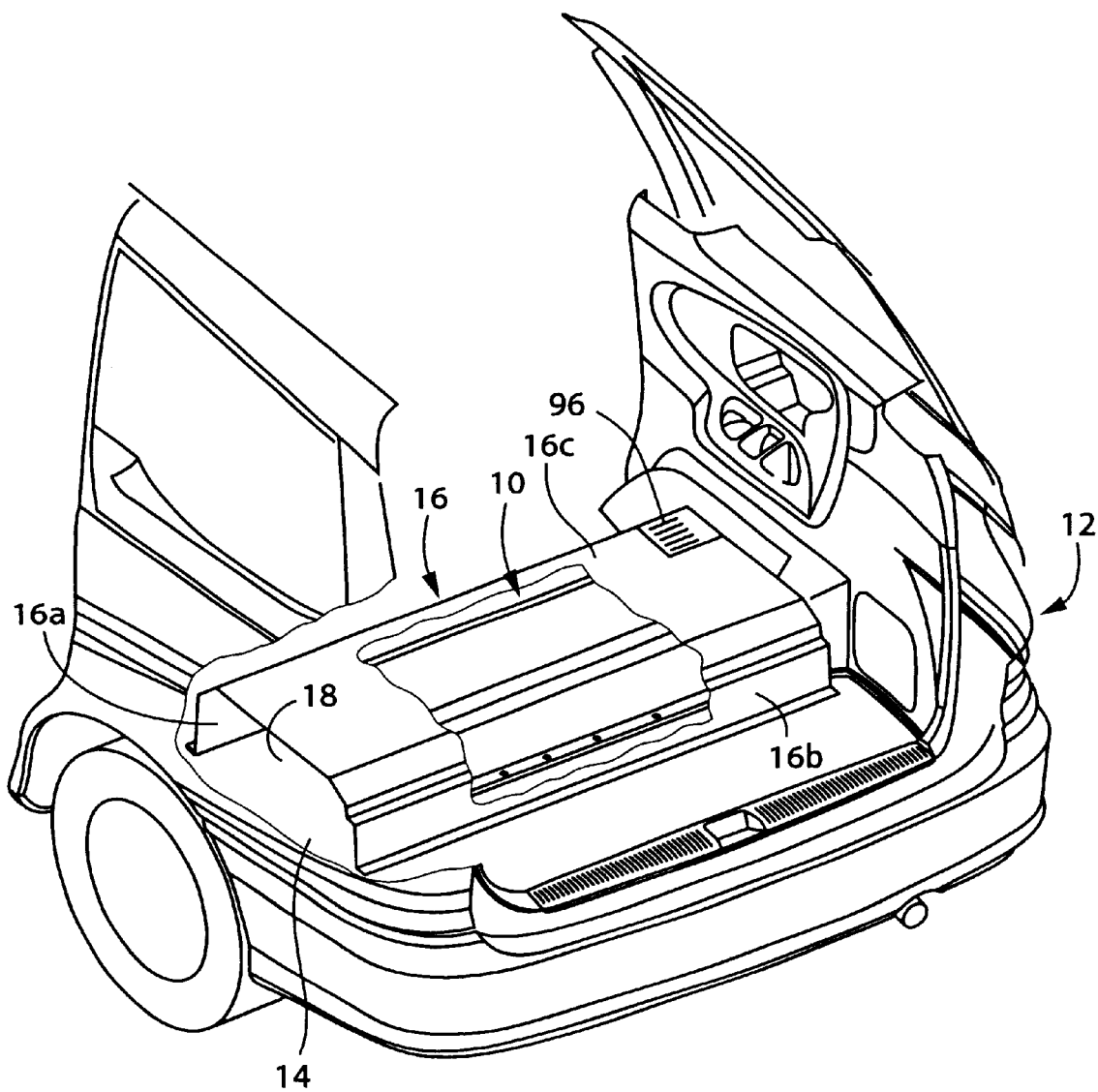
FIG. 1 is a fragmentary perspective view of an automotive vehicle equipped with an electric power source device including a battery pack, which device is constructed according to one embodiment of this invention.

Reference is first made to FIG. 1, there is shown a part of an automotive vehicle 12 in the form of an electric or hybrid vehicle equipped with an electric power source device including a generally elongate battery pack 10 which has a comparatively large capacity. The battery pack 10 constitutes a major portion of the electric power source device (hereinafter referred to as "power source device" where appropriate). The battery pack 10 is disposed under an under-seat covering panel 16 on which a rear seat 78 of bench type shown in FIG. 5 rests. The battery pack 10 is positioned such that its longitudinal direction is parallel to the transverse or lateral direction of the vehicle 12, which is perpendicular to the longitudinal or running direction of the vehicle. The covering panel 16 is fixed on a floor panel 14 which functions as a floor or an underbody of the vehicle 12. The floor panel 14 partially defines a compartment in which seats including the rear seat 78 are fixedly provided.

The under-seat covering panel 16 is a generally elongate member which is generally inverted-U-shaped in cross section. The covering panel 16 includes a front wall 16a and a rear wall 16b which extend substantially vertically, and a connecting top wall 16c which connects the front and rear walls 16a, 16b to each other at their upper ends. The covering panel 16 is fixed to the floor panel 14 as with bolts, at the lower end portions of the front and rear walls 16a, 16b, such that the covering panel 16 and the floor panel 14 cooperate with each other to define therebetween a generally elongate interior space 18 which extends in the lateral direction of the vehicle 12. When the bench type rear seat 78 is placed in its non-use position in which it cannot serve as a seat, the covering panel 16 also functions as a part of the vehicle floor. The vertical dimensions of the front and rear walls 16a, 16b of the covering panel 16 are determined such that the vertical dimension of the interior space 18 is slightly larger than that of the battery pack 10, as is apparent from FIG. 5.

Figure 5:
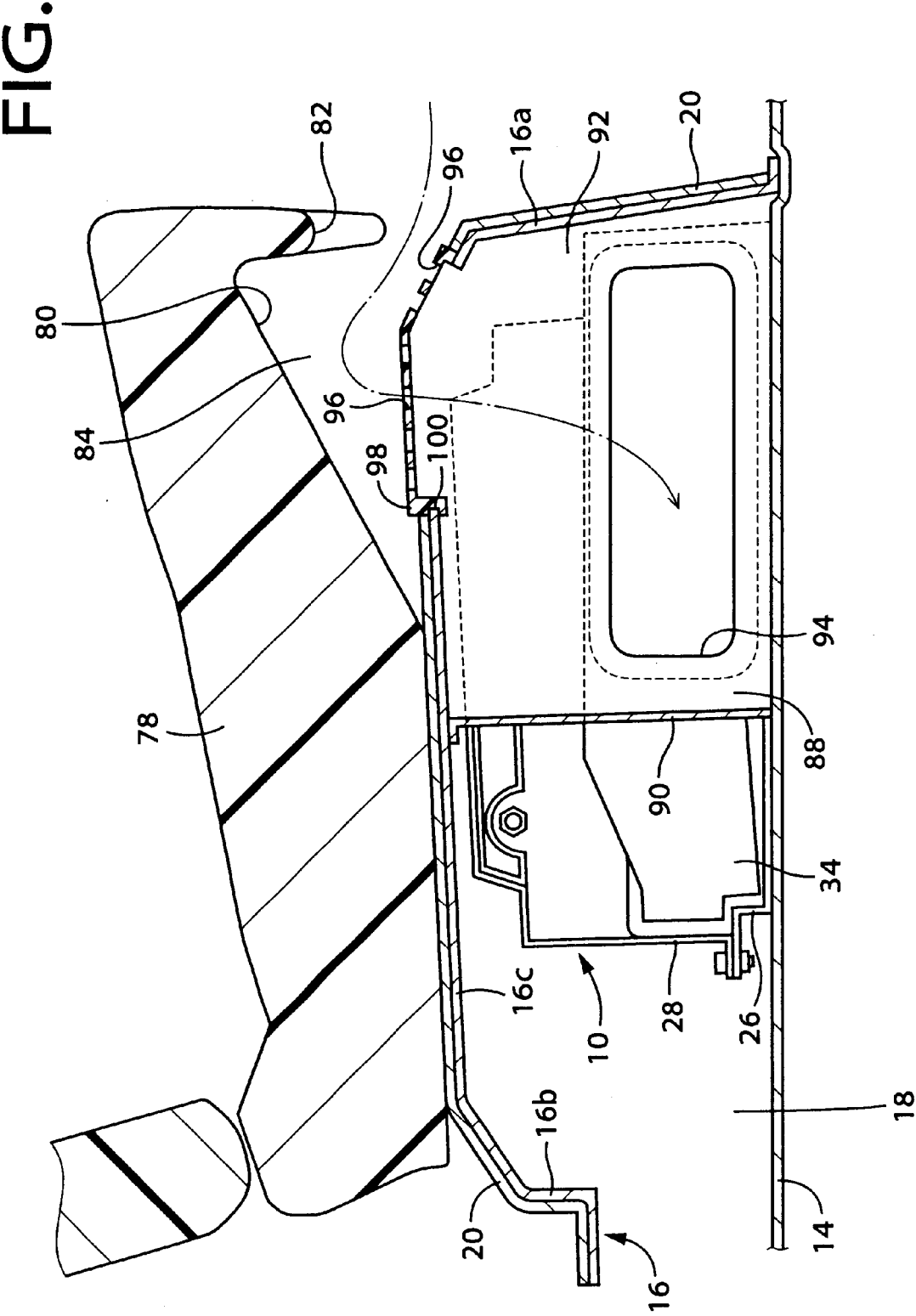
FIG. 5 is a view in transverse cross section taken along line 5—5 of FIG. 6, showing the position of the battery pack of FIG. 1 in relation to a rear seat and an under-seat covering panel of the vehicle.

The battery pack 10 is accommodated within the interior space 18 and is covered by the under-seat covering panel 16, such that the battery pack 10 is disposed adjacent to the vehicle compartment, within the body shell of the vehicle 12, but is substantially isolated from the vehicle compartment by the covering panel 16. Thus, the covering panel 16 functions to cover the battery pack 10, and cooperates with the battery pack 10 and the floor panel 14 to constitute the power source device of the vehicle 12. The floor panel 14 and covering panel 16 are formed from steel or other metallic plates which are magnetic and electrically conductive, and therefore may function as electromagnetic shielding members. In FIG. 5, reference numeral 20 denote decorative or ornamental members in the form of panels made of a soft material, or decorative mats each having a fibrous top layer.

Figure 2:
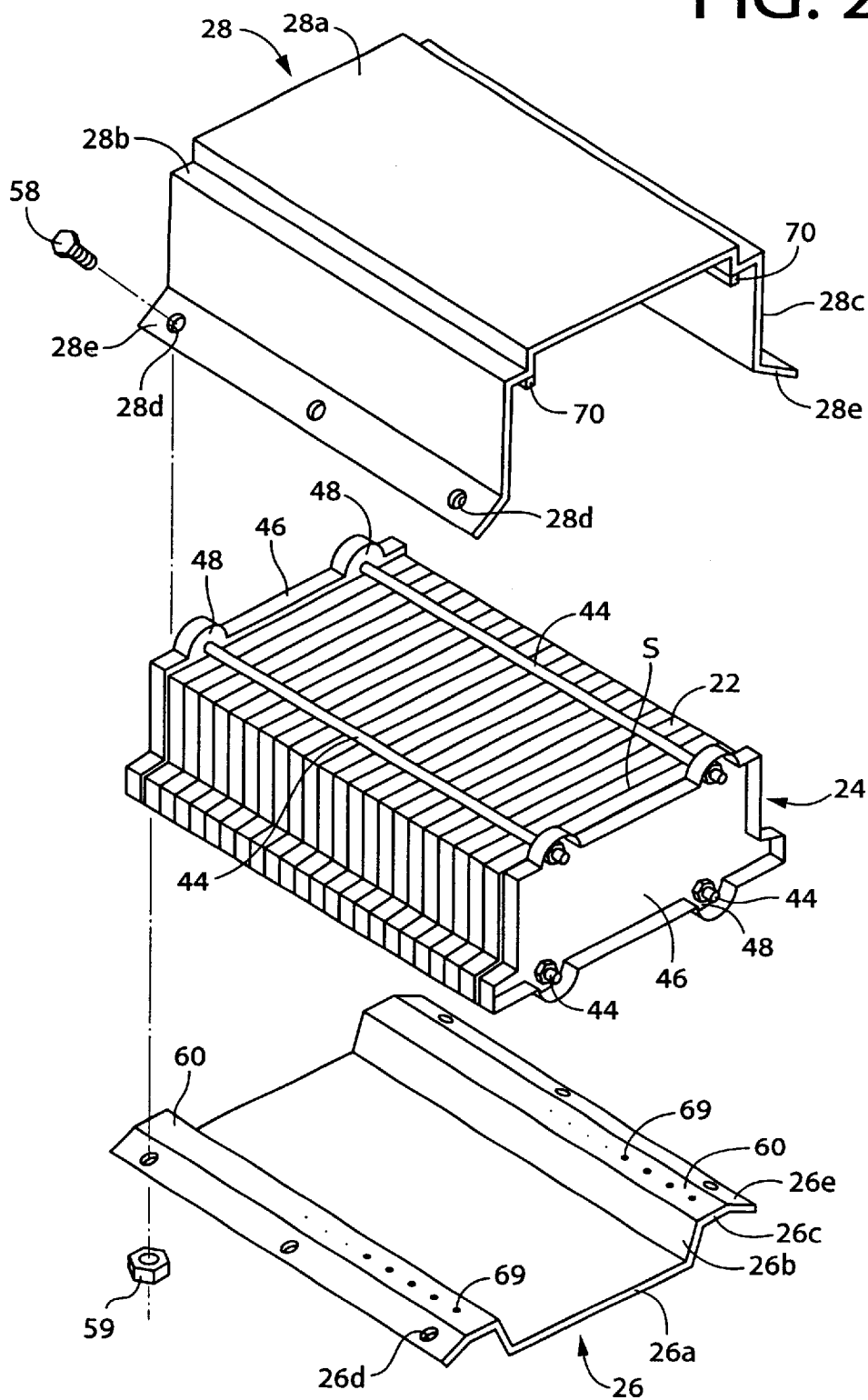
FIG. 2 is a perspective exploded view showing a construction of the battery pack of FIG. 1.
Figure 3:
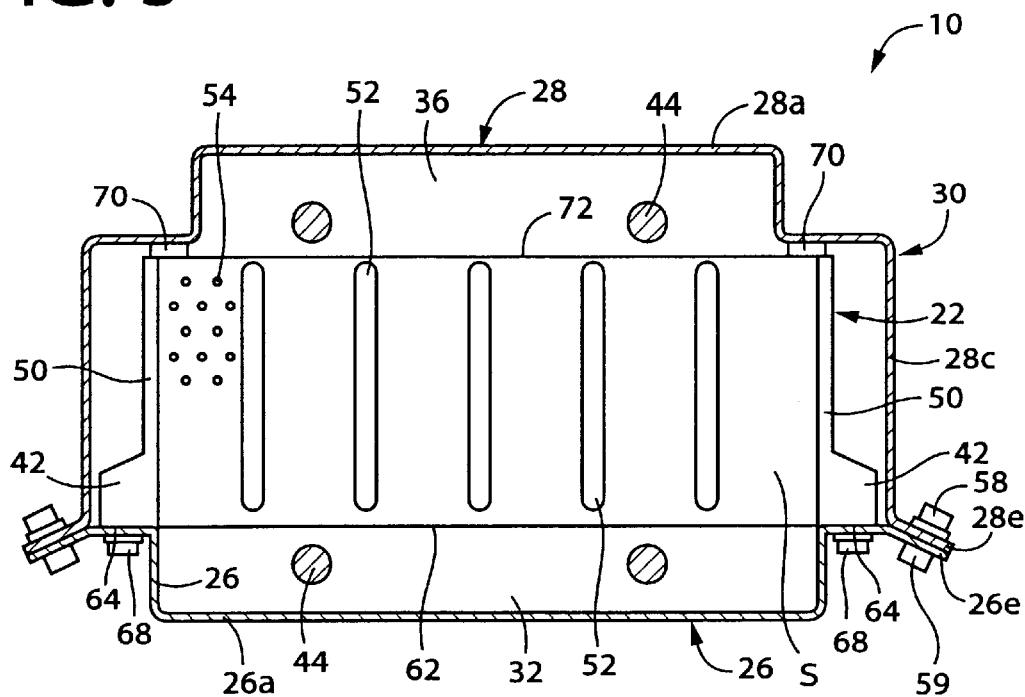
FIG. 3 is an elevational view in transverse cross section of the battery pack of FIG. 2.
Figure 4:
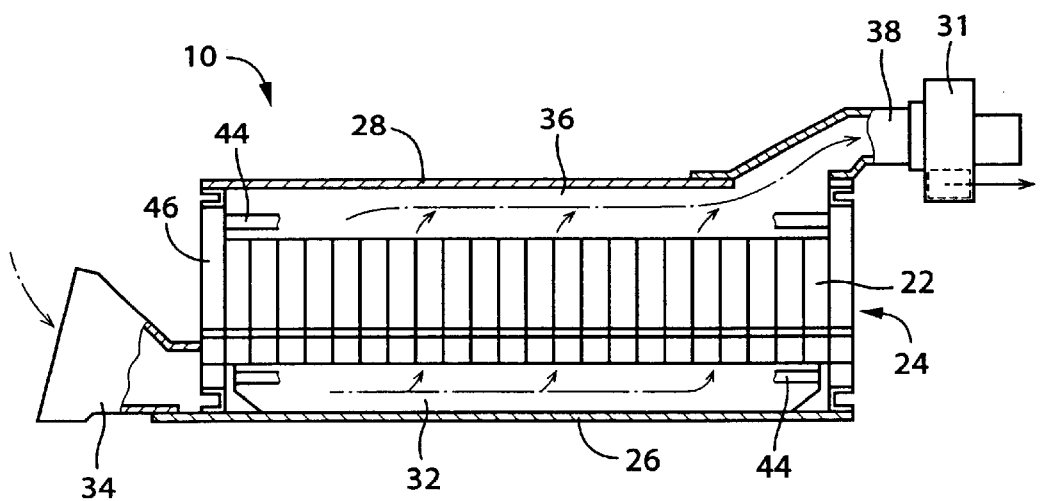
FIG. 4 is a schematic view in longitudinal cross section showing an air cooling arrangement in the battery pack of FIG. 1.

The battery pack 10 is constructed as shown in the exploded perspective view of FIG. 2 and the transverse cross sectional view of FIG. 3. Described in detail, the battery pack 10 includes a battery module or unit 24, a battery casing 30 accommodating the battery module 24, an air intake duct 34, and an air exhaust duct 38. The battery casing 30 consists of a lower case 26 and an upper case 28. As shown in FIG. 3, the battery module 24 is a stack of a multiplicity of generally rectangular planar battery cells 22 which are superposed on each other in the direction of thickness of each cell such that gaps S are provided on the opposite sides of each battery cell 22 and between adjacent ones of the battery cells 22. The gaps S extend through the battery module 24 in the vertical direction as seen when the battery pack 10 is installed in place. The lower case 26 cooperates with the battery module 24 to define therebetween an air intake chamber 32, as shown in FIG. 3. The air intake duct 34 is held in communication with one end of the air intake chamber 32, as shown in FIG. 4, for introducing air from the vehicle compartment into the air intake chamber 32. On the other hand, the upper case 28 cooperates with the battery module 24 to define therebetween an air exhaust chamber 36, as shown in FIG. 3. The air exhaust duct 38 is held in communication with one end of the air exhaust chamber 36 as shown in FIG. 4, for discharging the air from the air exhaust chamber 36.

The lower case 26 is formed by pressing from a metal sheet, and includes: a horizontal bottom wall 26a; a pair of side walls 26b extending upwards from the respective opposite ends of the bottom wall 26a, such that the side walls 26b are almost perpendicular to the bottom wall 26a; a pair of bearing walls 26c extending from the upper ends of the respective side walls 26b, outwardly of the side walls 26b, such that the bearing walls 26c are parallel to the bottom wall 26a; and a pair of mounting walls 26e having through-holes 26d and extending from the outer ends of the respective bearing walls 26c, outwardly of the bearing walls 26c, such that the mounting walls 26e are inclined downwards toward the level of the bottom wall 26a as they extend outwards from the bearing walls 26c.

The upper case 28 is also formed by pressing from a metal sheet and includes: a horizontal bottom wall 28a; a pair of stepped walls 28b provided at the respective opposite ends of the bottom wall 28a, each stepped wall 28b being L-shaped in cross section; a pair of side walls 28c extending downwards from the outer ends of the respective stepped walls 28b such that the side walls 28c are almost perpendicular to the bottom wall 28a; and a pair of mounting walls 28e having through-holes 28d and extending from the lower ends of the respective side walls 28c, outwardly of the side walls 28c, such that the mounting walls 28e are inclined downwards away from the level of the bottom wall 28a as they extend outwards from the side walls 28c.

As indicated above, each of the lower and upper cases 26, 28 which constitute respective lower and upper portions of the battery casing 30 is formed by a press-forming operation, by bending a metal sheet along straight lines parallel to the longitudinal direction of the battery module 24. The thus formed lower and upper cases 26, 28 are fixed to each other at the mounting walls 26e, 28e each located at the opposite lateral ends of the case 26, 28, with fastening bolts 58 which extend through the through-holes 26d, 28d and which are tightened by respective nuts 59, as indicated in FIG. 3. It is noted that the upper case 28 may be formed of a synthetic resin material by injection molding.

Each of the battery cells 22 of the battery module 24 of the battery pack 10 is a planar hollow structure made of a resin material and having a relatively small thickness. The planar hollow structure of each battery cell 22 has six mutually independent sections each of which accommodates a mass of electrolyte and electrodes which constitute a secondary cell such as a nickel cell or hydrogen cell. The battery cells 22 have positive and negative terminals (not shown) which are provided at upper portions of the lateral end faces and are connected in series. The battery cells 22 further have outlets (not shown) open in the top faces, for discharging an excessive amount of hydrogen. The battery pack 10 is positioned such that each battery cell 22 extends in the longitudinal or running direction of the vehicle 12, namely, such that the longitudinal direction of each battery cell 22 is parallel to the longitudinal direction of the vehicle 12.

Each battery cell 22 has a pair of leg portions 42 extending outwards from lower portions of the opposite lateral end faces in its longitudinal direction, as shown in FIG. 3. The battery cells 22 superposed on each other in their thickness direction are bound in a stack by and between two end plates or binder plates 46 which are forced toward each other against the opposite ends of the elongate stack in the longitudinal direction of the stack, by two pairs of tightening members in the form of rods 44 which are disposed on the respective upper and lower sides of the stack. As a result, the adjacent battery cells 22 are held in close contact with each other. Each binder plate 46 has two pairs of brackets 48, which extend upwards and downwards from the respective upper and lower end faces of the binder plate 46, as shown in FIG. 2.

On each of the generally rectangular opposite major surfaces of each battery cell 22 which are held in contact with those of the adjacent battery cells 22, there are formed two first vertically elongate projections 50 at the respective longitudinally opposite ends, five vertically elongate projections 52 located between the two first projections 50, and a matrix of small circular projections 54 between the adjacent ones of the first and second vertically elongate projections 50, 52, as shown in FIG. 3. The first and second projections 50, 52 extend in the vertical direction, as seen in FIG. 3, that is, in the direction perpendicular to the longitudinal and thickness direction of the battery cell 22. The first and second projections 52 are equally spaced apart from each other in the longitudinal direction of the battery cell 22. The small circular projections 54 are located in a matrix, with a suitable density, between the adjacent projections 50, 52. The projections 50, 52 are located at the positions of the partition walls which define the six mutually independent sections within the hollow structure of the battery cell 22. The projections 50, 52 extending from the opposite major surfaces of each battery cell 22 are held in contact at their ends with the projections 50, 52 of the adjacent battery cells 22, so that a tightening force applied to the battery cells 22 by the binder plates 46 and tightening rods 44, namely, a compressive force acting on the stack of the battery cells 22 is received by the projections 50, 52, so as to prevent deformation of the battery cells 22. The first and second vertically elongate projections 50, 52 cooperate with the small circular projections 54 to define the above-indicated gaps S in the form of a vertically extending slit between the adjacent battery cells 22 and binder plates 46. In the present embodiment, the projections 50, 52, 54 have a distance of projection of about 1.0 mm, so that the dimension of each slit or gap S as measured in the direction of thickness of the battery cells 22 is about 2.0 mm. The projections 50, 52, 54 of each battery cell 22 are held in close contact with those of the adjacent battery cells 22.

The bearing walls 26c of the lower case 26 has upper bearing surfaces 60 which support the battery cells 22 at their longitudinal opposite end portions. These bearing surfaces 60 extend in parallel with each other in the thickness direction of the battery cells 22 (longitudinal direction of the battery module 24), and are spaced apart from each other by a distance smaller than the longitudinal dimension of the battery cells 22.

The two leg portions 42 of each battery cell 22 has respective seating surfaces 64, which are longitudinally opposite end portions of a lower end face 62 in which the gaps S are open downwards. The battery cells 22 fixedly rest on the lower case 26 such that the seating surfaces 64 are seated on the bearing surfaces 60 of the lower case 26. In this state, the air intake chamber 32 indicated above is defined by the lower end face 62 of each cell 22 and the pair of side walls 26b and bottom wall 26a of the lower case 26. Each battery cell 22 is fixed to the lower case 26 by bolts 68 which extend through respective through-holes 69 formed through the bearing walls 26c of the lower case 26. The bolts 68 are screwed into respective cylindrical cap nuts (not shown) which are embedded in the seating surfaces 64.

Each battery cell 22 has an upper end face 72 opposite to the lower end face 62. The upper case 28 has two elongate sealing members 70 fixed to the inner surface of the stepped walls 28b, which inner surface is opposite to the upper end face 72, as shown in FIGS. 2 and 3. For instance, the sealing members 70 are fixed with a bonding agent. The sealing members 70 are positioned for abutting contact with the respective longitudinal end portions of the upper end face 72. In this state, the air exhaust chamber 36 is defined by and between a portion of the upper case 28 located between the two sealing members 70, and the upper end face 72 of each battery cell 22. For example, the sealing members 70 may be formed of an elastically deformable material such as a synthetic resin sponge or a soft rubber material.

As shown in the cross sectional view of FIG. 5, the lower surface of the rear seat 78 which rests on the connecting wall 16c of the under-seat covering panel 16 has a relatively elongate recess 80 formed in a relatively front part thereof. The recess 80 extends in the direction of length of the rear seat 78 which is parallel to the transverse or lateral direction of the vehicle 12. Between the front end portion of the covering panel 16 and the lower end of the front end portion of the rear seat 78, there is formed a generally elongate opening 82 in the form of an elongate slot. The rear seat 78 having the recess 80 cooperates with the covering panel 16 to define a generally elongate under-seat space 84 which extends in the lateral direction of the vehicle 12 and which is held in communication with a space in front of the rear seat 78, through the opening 82. For example, the rear seat 78 has a length of about 120 cm (in the lateral direction of the vehicle 12), and the opening 82 has a length slightly smaller than the length of the rear seat 78 and a vertical dimension of about several centimeters (e.g., 2–3 cm). The under-seat space 84 has a length substantially equal to that of the rear seat 78, and the largest dimension of the under-seat space 84 as measured in the longitudinal direction of the vehicle 12 is about one-third of the corresponding dimension of the rear seat 78 or the connecting wall 16c of the covering panel 16. The connecting wall 16c has a front end portion which is inclined downwards as it extends in the forward direction of the vehicle 12. The opening 82 indicated above is defined between that inclined front end portion of the connecting wall 16c and the lower end of the front end portion of the rear seat 78.

Figure 6:
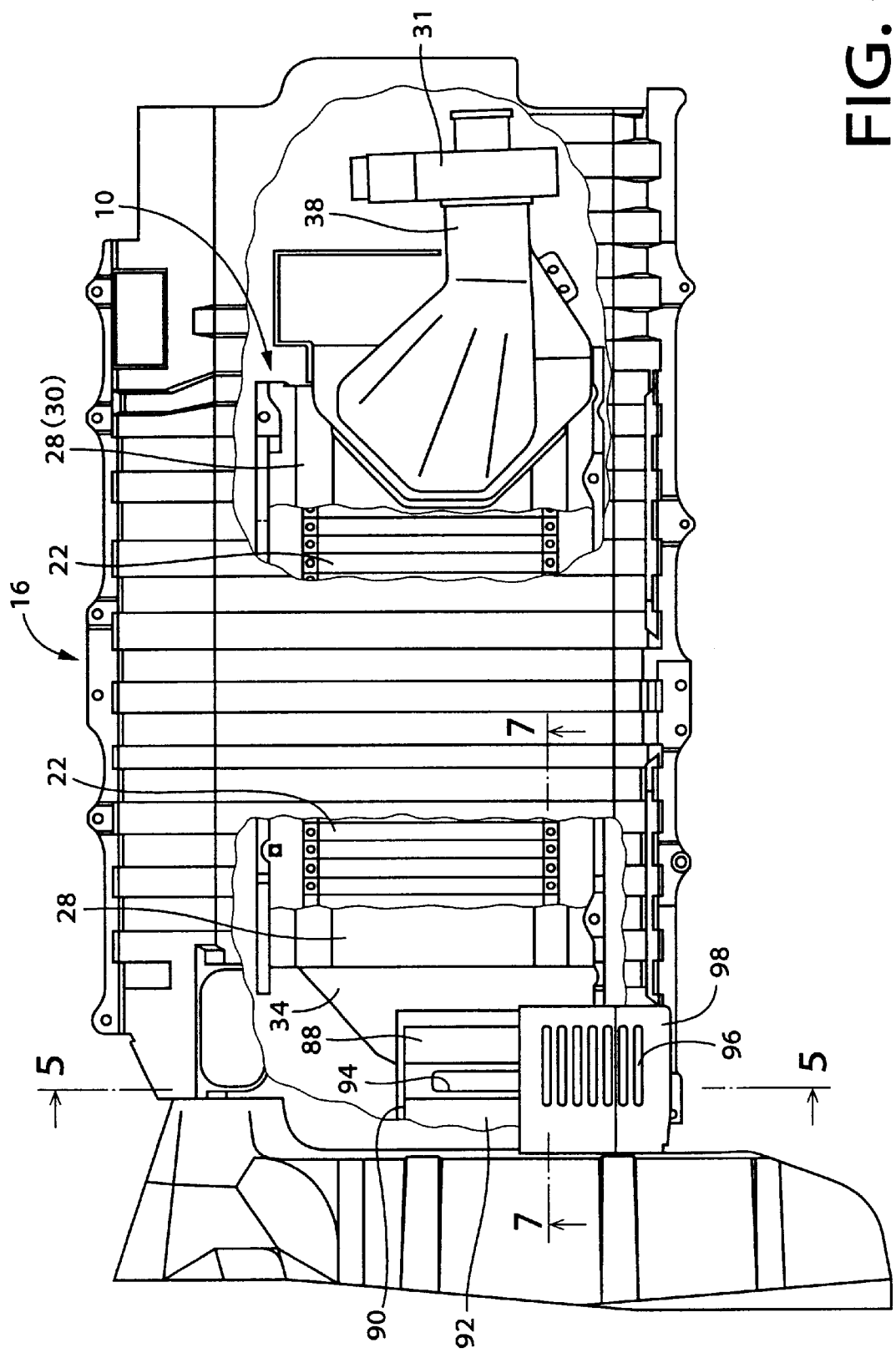
FIG. 6 is a partly cut-away plan view showing the under-seat covering panel of FIG. 5.
Figure 7:
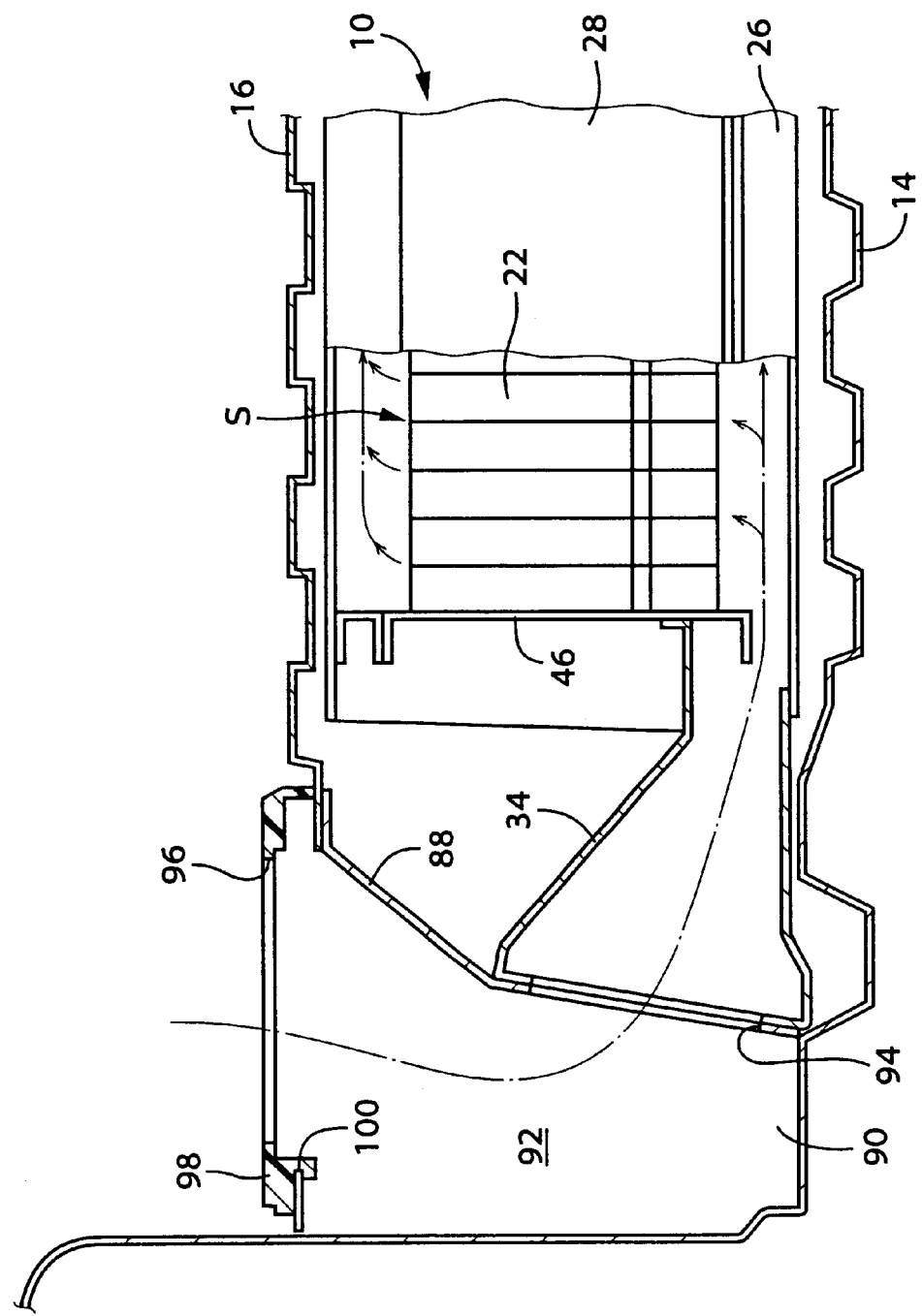
FIG. 7 is a cross sectional view taken along line 7—7 of FIG. 6, showing an air intake arrangement in the power source device of FIG. 1.
Figure 8:
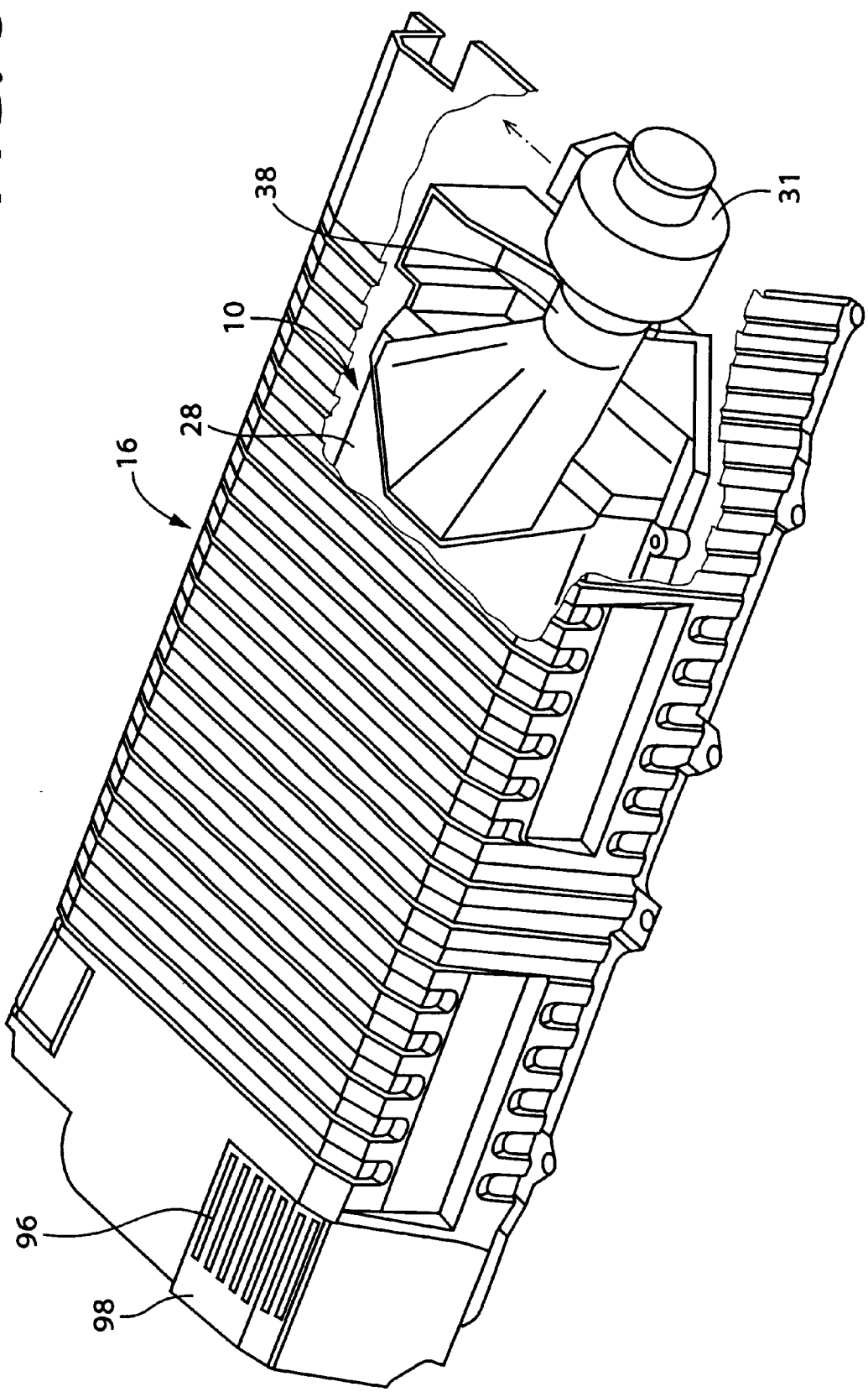
FIG. 8 is a partly cut-away perspective view of the under-seat covering panel of FIG. 5.

The under-seat covering panel 16 will be described in greater detail, by reference to the partly cut-away plan view of FIG. 6, the cross sectional view of FIG. 7, and the partly cut-away perspective view of FIG. 8. The cross sectional view of FIG. 5 is taken along line 5—5 of FIG. 6, and the cross sectional view of FIG. 7 is taken along line 7—7 of FIG. 6. As shown in FIGS. 6–8, the air intake duct 34 communicates indirectly with the under-seat space 84, so that the air within the vehicle compartment is introduced into the air intake duct 34 through the under-seat space 84. Described more specifically, the interior space 18 defined between the covering panel 16 and the floor panel 14 includes an air inlet chamber 92 at a portion thereof on the right-hand side of the vehicle 12. The air inlet chamber 92 is defined by a partition wall 88 parallel to the longitudinal direction of the vehicle 12, and a partition wall 90 which is parallel to the lateral direction of the vehicle 12 and is therefore perpendicular to the partition wall 88. As shown in FIGS. 4 and 7, the air intake duct 34 is communicated at one of its opposite ends with the air intake chamber 32 through an opening formed between the right-hand side end portion of the lower case 26 and the corresponding binder plate 46 of the battery module 24. The air intake duct 34 is communicated at the other end with the air inlet chamber 92 through a rectangular opening 94 formed through the partition wall 88. The air inlet chamber 92 is communicated with the under-seat space 84 through a plurality of parallel slits 96 formed through a front right portion of the covering panel 16, which portion is located under the under-seat space 84. The front end portion of the connecting wall 16c of the covering panel 16 has an aperture 100 which is closed by a synthetic resin cover 98 fixed therein. This synthetic resin cover 98 has the parallel slits 96 formed through its entire thickness. Thus, the air inlet chamber 92 within the interior space 18 is held in communication with the under-seat space 84 through the slits 96 formed through the synthetic resin cover 98, which closes the aperture 100 formed through the covering panel 16.

As shown in FIGS. 4, 6 and 8, the air exhaust duct 38 is connected at one end thereof to a blower fan 31 functioning as a cooling and air-exhausting fan, and at the other end to the air exhaust chamber 36 through a cutout formed in the left end portion of the upper case 28. The blower fan 31 is communicated with the exterior of the vehicle 12, through an appropriate duct. The electric power source device including the battery pack 10 is arranged to turn on the blower fan 31 connected to the air exhaust duct 38, when the detected temperature of the battery cells 22 has exceeded a predetermined upper limit, so that a further rise of the temperature is prevented by the air flow through the air intake chamber 32, gaps S and air exhaust chamber 36. With an operation of the blower fan 31, the air within the vehicle compartment is introduced into the gaps S between the battery cells 22, through the slits 96, air inlet chamber 92, air intake duct 34, air intake chamber 32, and is discharged into the exterior of the vehicle 12 through the air exhaust chamber 36, air exhaust duct 38 and blower fan 31. As a result, the battery cells 22 are cooled by the flows of the air through the gaps S between the adjacent ones of the battery cells 22.

It will be understood from the foregoing description of the present first embodiment of this invention that the slits 96, air inlet chamber 92, rectangular opening 94, air intake duct 34 and air intake chamber 32 cooperate with each other to function as an air inlet passage, while the slits 96 function as an inlet of the air intake passage, and that the air exhaust chamber 36, air exhaust duct 38, blower fan 31 and another duct (not shown) connected to the blower fan 31 cooperate with each other to function as an air exhaust passage.

In the power source device constructed according to the present first embodiment described above, the battery casing 30 is disposed in the interior space 18 which is substantially isolated from the vehicle compartment by the under-seat covering panel 16, and the battery cells 22 is accommodated within the battery casing 30. The battery cells 22 are cooled by introducing the air within the vehicle compartment into the battery casing 30 through the slits 96 formed through the covering panel 16, and through the air intake passage (slits 96, air inlet chamber 92, rectangular opening 94, air intake duct 34 and air intake chamber 32). The present arrangement permits the air intake passage to have a reduced length, and an accordingly reduced resistance to flow of the air therethrough for cooling the battery cells 22, so that the battery cells 22 can be cooled with an improved degree of efficiency. Thus, the present power source device has an accordingly increased efficiency of cooling of the battery cells 22. Further, the required lengths of the components providing the air intake passage, such as the air intake duct 34, can be shortened, so that these components are available at reduced costs, and the battery pack 10 is available at an accordingly reduced cost.

Further, the present power source device is arranged such that the slits 96 functioning as the inlet open end of the air intake passage are located under the lower surface of the rear seat 78, and are held in communication with the under-seat space 84 partially defined by the lower surface of the rear seat 78, so that the air within the vehicle compartment is introduced into the air intake chamber 32 of the battery pack 10 through the under-seat space 84. Described more specifically, the relatively elongate opening 82 is formed so as to extend in the lateral direction of the vehicle 12, between the under-seat covering panel 16 and the lower surface of the rear seat 78. The under-seat space 84 communicates with the space in front of the rear seat 78, through the generally elongate opening 82, so that the air within the vehicle compartment is introduced into the air intake passage through the under-seat space 84, and the slits 96 at the inlet of the air intake passage. Accordingly, the length of the air intake passage for introducing the air into the battery casing 30 to cool the battery pack 10 disposed under the rear seat 78 can be significantly shortened, so that the resistance to the air flow through the air intake passage is accordingly reduced. Further, the otherwise dead space under the rear seat 78 is utilized as a space in communication with the slits 96 which serve as the inlet of the air intake passage, and these slits 96 are generally covered by the rear seat 78, so as to reduce the level of noise of the air stream into the interior space 18 and the amount of entry of dust and dirt into the interior space 18, contrary to slits formed through the front wall 16a of the covering panel 16.

In the present embodiment, the multiplicity of battery cells 22 of the battery pack 10 are superposed on each other in the direction of thickness of each cell so as to constitute the generally elongate battery module 24 wherein the gaps S are formed between the adjacent battery cells 22, so as extend in the vertical direction. The battery pack 10 is disposed under the elongate rear seat 78 such that the longitudinal direction of the generally elongate battery module 24 is parallel to the lateral direction of the vehicle 12 along which the rear seat 78 is disposed. The air introduced through the air intake passage is fed to flow through the gaps S, thereby effectively cooling the battery cells 22 of the battery module 24 which are stacked in their thickness direction, so that the expected life expectancy of the battery module 24 is prolonged.

In addition, the battery module 24 is accommodated within the battery casing 30 such that the air intake chamber 32 and the air exhaust chamber 36 which communicate with each other through the gaps S between the cells 22 are formed on the opposite sides of the battery module 24, so that the air introduced into the air intake chamber 32 through the air intake passage is effectively fed to flow through the gaps S, air exhaust chamber 36 and air exhaust duct 38, with an operation of the blower fan 31 connected to the air exhaust duct 38, so that the battery module 24 can be efficiently cooled so as to effectively prolong the service life of the battery module 24.

Furthermore, the air exhaust passage is provided to discharge the air from the air exhaust chamber 36 within the battery casing 30 into the exterior space of the vehicle 2, so that a temperature rise within the interior space 18 in which the battery casing 30 is accommodated can be avoided, owing to the effective dissipation of heat by discharging the air which has been heated during the flow through the gaps S between the adjacent battery cells 22.

A second embodiment of the present invention will be described. The same reference as used in the first embodiment will be used in the second embodiment, to identify the functionally corresponding elements. Redundant description of these elements is deemed unnecessary.

Figure 10:
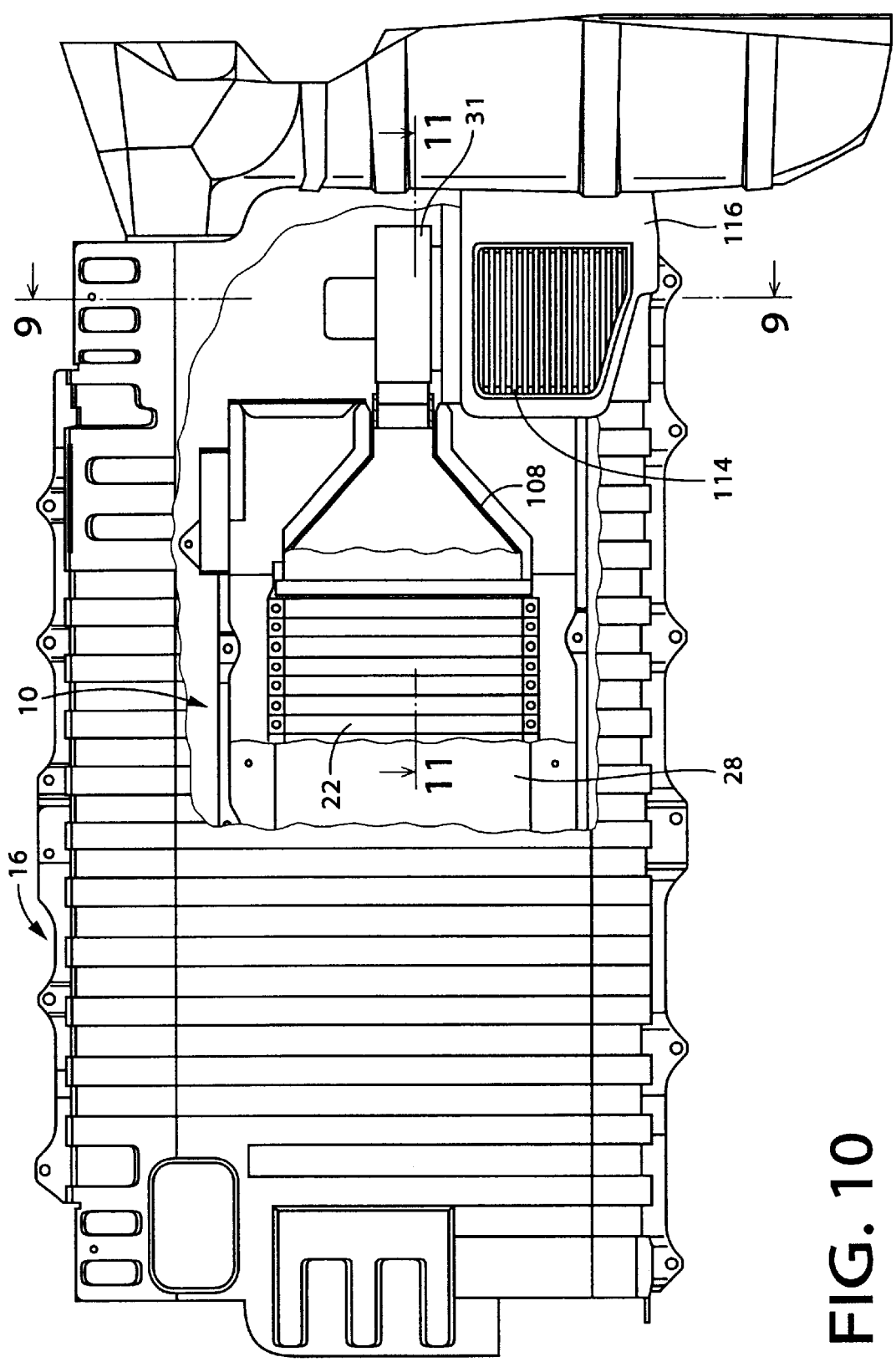
FIG. 10 is a partly cut-away plan view corresponding to that of FIG. 6, showing the under-seat covering panel in the embodiment of FIG. 9.
Figure 11:
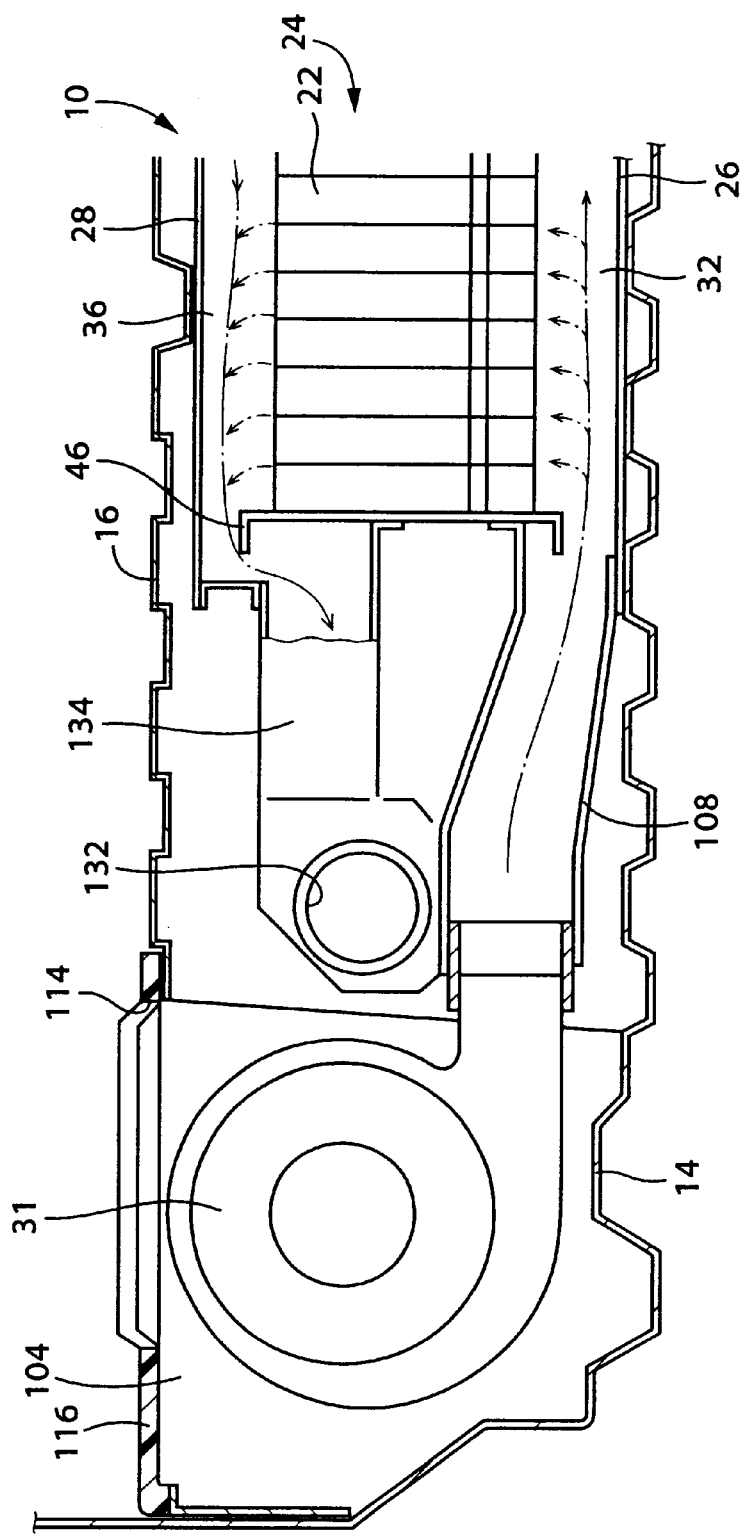
FIG. 11 is a cross sectional view taken along line 11—11 of FIG. 10, showing an air intake arrangement in the power source device of FIG. 9.
Figure 12:
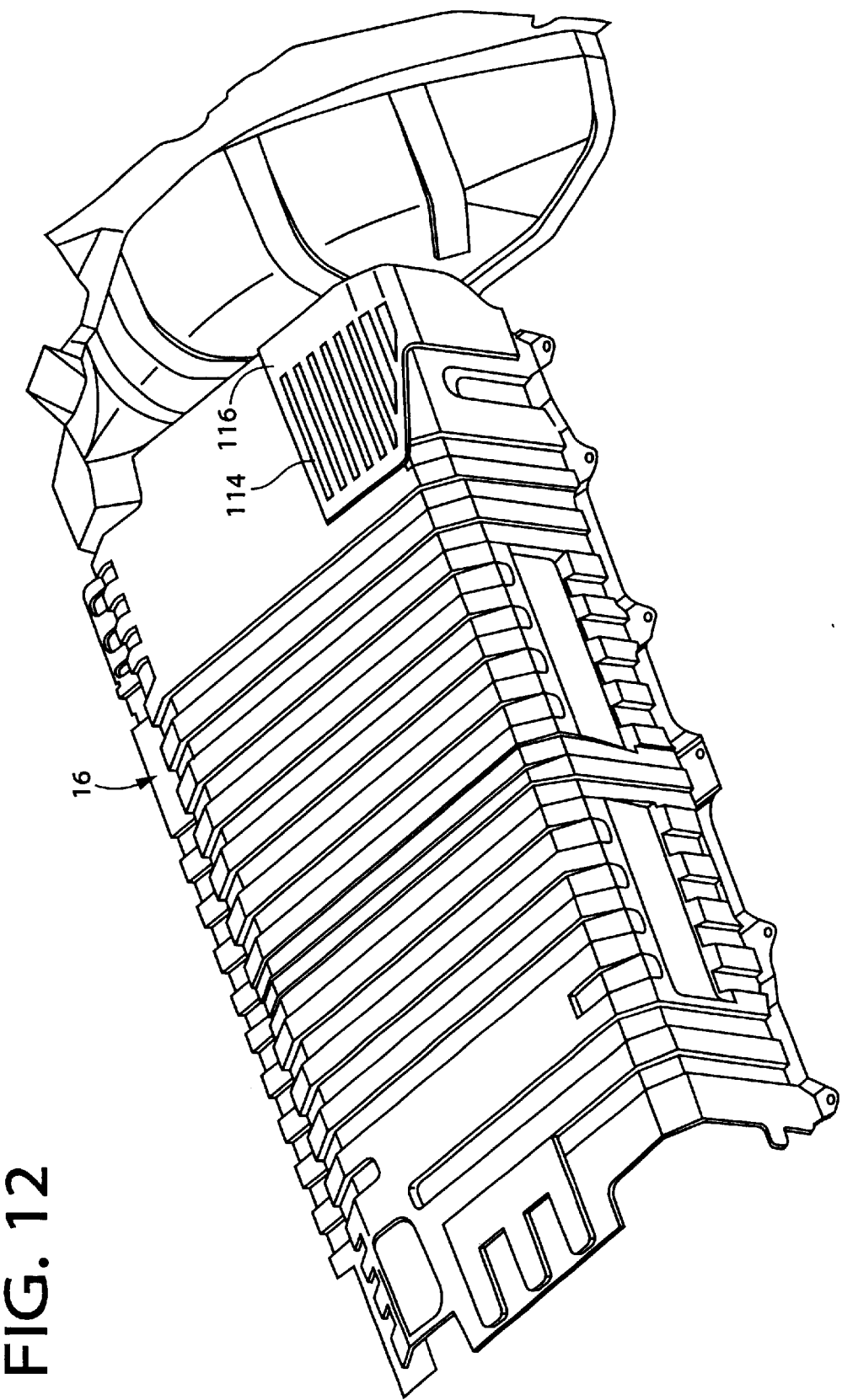
FIG. 12 is a perspective view corresponding to that of FIG. 8, showing the under-seat covering panel of FIG. 9.

The second embodiment will be described by reference to the transverse cross sectional view of FIG. 9, the partly cut-away plan view of FIG. 10, the cross sectional view of FIG. 11, and the perspective view of FIG. 12. The transverse cross sectional view of FIG. 9, which corresponds to that of FIG. 5, is taken along line 9—9 of FIG. 10, to show the rear seat 78 and the under-seat covering panel 16 which supports the rear seat 78. The plan view of FIG. 10, which corresponds to that of FIG. 6, shows the covering panel 16, and the cross sectional view of FIG. 11 is taken along line 11—11 of FIG. 10, to show a portion of the interior of the covering panel 16. The perspective view of FIG. 12 shows the covering panel 16. In FIG. 10, the air exhaust duct 134 is not shown.

In the present second embodiment, too, the battery pack 10 is disposed in the interior space 18 defined by the floor panel 14 and the covering panel 16, such that the battery pack 10 is located adjacent to the vehicle compartment and is substantially isolated by the covering panel 16 from the vehicle compartment by the covering panel 16.

The interior space 18 includes an air inlet chamber 106 at a portion thereof on the left-hand side of the vehicle 12. The air inlet chamber 106 is defined by a partition wall 104 parallel to the lateral direction of the vehicle 12, and a partition wall 105 which is parallel to the longitudinal direction of the vehicle 12. The air inlet chamber 106 is provided within the interior space 18, in order to thermally insulate this air inlet chamber 106 from the rest of the interior space 18. Described in detail, the temperature within the interior space 18 is relatively high so that it is necessary to first introduce the relatively cool air within the vehicle compartment into the thermally insulated air inlet chamber 106, when the blower fan 31 is operated. If the air inlet chamber 106 were not provided, the relatively hot air within the interior space 18 would be fed into the battery pack 10.

As shown in FIG. 11, an air intake duct 108 is connected at one end thereof to an opening between the left-hand side end portion of the lower case 26 and the lower end of the corresponding binder plate 46, and at the other end to the blower fan 31. The blower fan 31 has an air inlet sleeve 110 fitted in a circular aperture 112 formed through the partition wall 104, as shown in FIG. 9. Thus, the air intake duct 108 is held in communication with the air inlet chamber 106. The covering panel 16 has a plurality of slits 114 formed at its left-hand side end portion such that the slits 114 are located under the under-seat space 84 partially defined by the rear seat 78. The air inlet chamber 106 is held in communication with the under-seat space 84 through the slits 114. As described below, the air inlet chamber 106 constitutes a part of a generally curved air intake passage, while the slits 114 function as the inlet of this air intake passage. As indicated by arrow-headed one-dot chain line in FIG. 9, the air introduced into the air inlet chamber 106 through the slits 114 is fed into the aperture 112 along the generally curved air intake passage including a vertical or first straight segment extending substantially downwards from the slits 114, a horizontal or second straight segment extending substantially horizontally in the rearward direction of the vehicle 12, and a curved segment connecting the first and second straight segments. The covering panel 16 has an aperture 118 formed through the front end portion of the connecting wall 16c. The aperture 118 is covered by a synthetic resin cover 116 which has the above-indicated slits 114 formed through its thickness.

Figure 9:
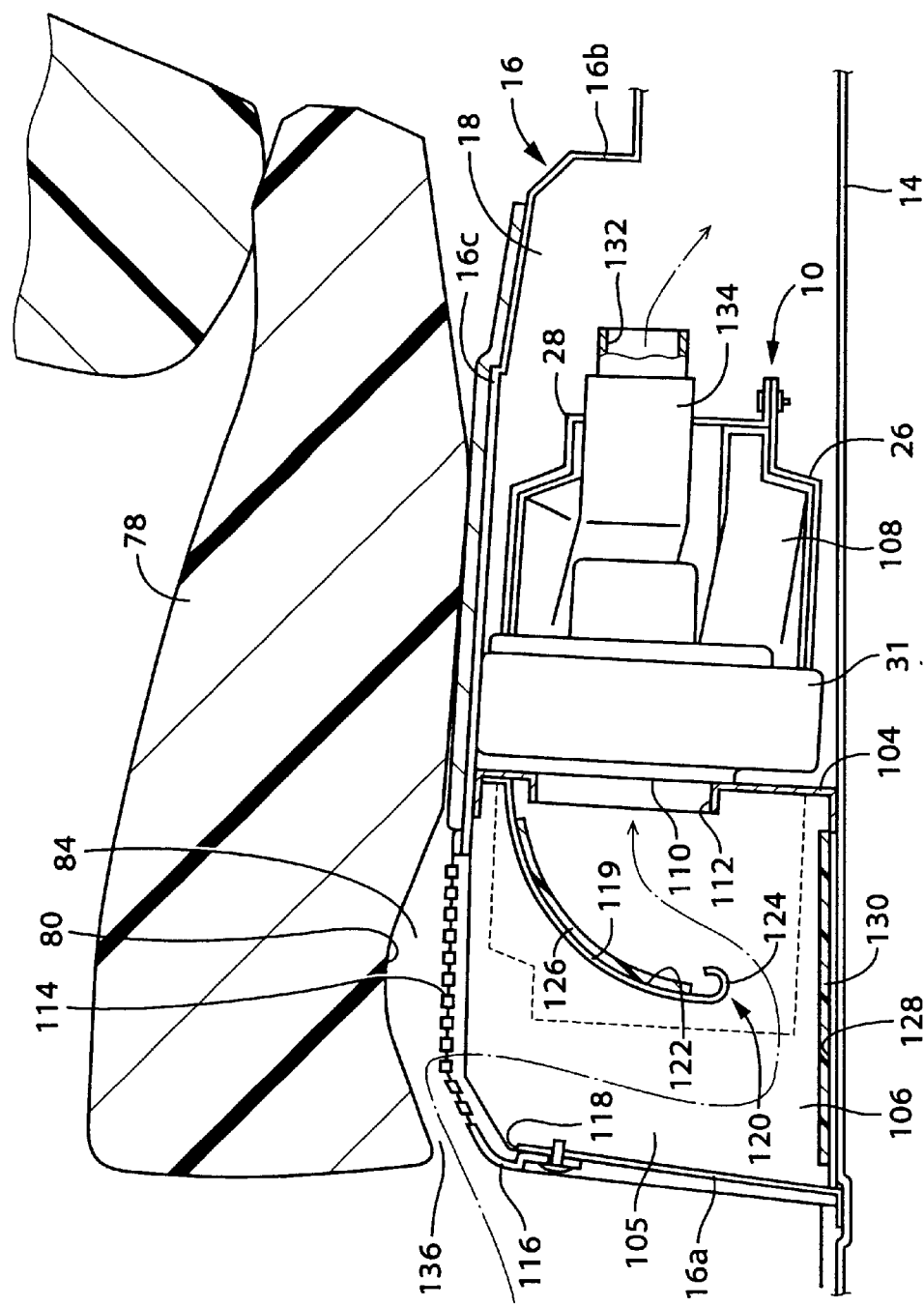
FIG. 9 is a view in transverse cross section taken along line 9—9 of FIG. 10, showing the position of a battery pack of a power source device constructed according to another embodiment of this invention, in relation to a rear seat and an under-seat covering panel of a vehicle.

As shown in FIG. 9, there is disposed a shielding plate in the form of a dust-and-sound-proof cover 119, in a portion of the air inlet chamber 106 which is generally under the slits 114. This cover 119 partially defines the above-indicated generally curved air intake passage, and prevents a flow of the air from the slits 114 directly toward the air inlet sleeve 110 of the blower fan 31. The cover 119 functions non only as a sound insulating plate to reduce the operating noise of the blower fan 31 which propagates through the slits 114, but also as a shield to reduce the amount of foreign matters which are introduced into the air inlet sleeve 110 of the blower fan 31. The foreign matters include dust and dirt contained in the air introduced through the slits 114, and a liquid spilt within the vehicle compartment. The dust-and-sound-proof cover 119 is curved such that the cover 119 approaches the floor panel 14 as it extends in the direction away from the air inlet sleeve 110, and such that a distance between a distal end portion 120 of the cover 119 and the floor panel 14 is slightly smaller than a distance between the lower end of the aperture 112 in the partition wall 104 and the floor panel 14. The cover 119 is fixed at a position on an inner side of a curve of the generally curved intake air passage, namely, fixed at its proximal end to a portion of the partition wall 104 which is located above the aperture 110. According to this arrangement, the cover 119 also functions to guide the air stream from the slits 114 into the circular aperture 112, along a considerably curved path which passes between the distal end portion 120 and the floor panel 14 and which has a considerably larger length than a path along which the air would flow from the slits 114 to the air inlet sleeve 110 if the cover 119 were not provided.

In the presence of the thus constructed dust-and-sound-proof cover 119 over which the slits 114 are provided, the air introduced downwards through the slits 114 into the air inlet chamber 106 cannot take the shortest path to the air inlet sleeve 110 of the blower fan 31, and is forced to flow along the curved path indicated by one-dot chain line in FIG. 9. Described more specifically, the air which has been introduced through the slits 114 is first directed downwards until it reaches the lower distal end portion 120 of the cover 119, and the air stream is then turned through a relatively large angle along the distal end portion 120 so that the air stream is directed toward the air inlet sleeve 110. This arrangement is effective to assure perfect freedom from entry of dust, dirt and liquid substances into the air inlet sleeve 110 of the blower fan 31, even if such foreign substances are introduced into the air inlet chamber 106 through the slits 114.

The lower distal end portion 120 of the cover 119 is turned on the side of an inner surface 122 of the cover 119 which faces the partition wall 104. Namely, the distal end portion 120 has a turning point 124 which is the lowest point nearest to the floor panel 14. The direction of extension of the distal end portion 120 changes at the turning point 124 so that the extreme end part extends generally upwards or towards the slits 114. The curved configuration of the lower distal end portion 120 of the cover 119 permits a smooth flow of the air at the distal end portion 120 toward the air inlet aperture 112, for thereby minimizing the deceleration of the air stream while reducing the noise caused by the air stream.

A sound absorber 126 formed of a urethane sponge is bonded to the inner surface 122 of the dust-and-sound-proof cover 119, and a similar sound absorber 130 is bonded to a bottom surface 128 of the air inlet chamber 106. These two sound absorber 126, 130 serve to absorb the operating noise of the blower fan 31.

Figure 13:
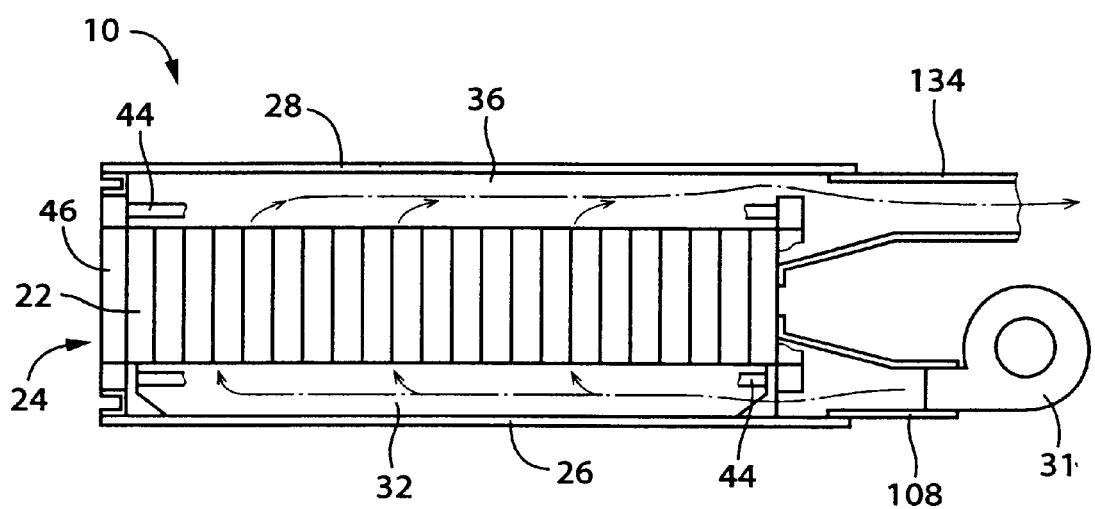
FIG. 13 is a schematic view in longitudinal cross section of an air cooling arrangement in the battery pack in the embodiment of FIG. 9.

As shown in FIG. 11, there is provided an air exhaust duct 134 which is connected at an outlet end 132 thereof to a duct (not shown) provided for discharging the air (which has been used to cool the battery cells 22) into the exterior of the vehicle 12. The air exhaust duct 134 is connected at the other end to an opening provided between the left-hand side end portion of the upper case 28 and the upper end of the corresponding binder plate 46. Thus, the air exhaust chamber 36 within the battery casing 30 is held in communication with the exterior of the vehicle 12 through the air exhaust duct 134 and the above-indicated duct connected thereto. The present electric power source device is arranged to activate the blower fan 31 connected to the air intake duct 108, upon detection of a rise of the temperature of the battery cells 22 above a predetermined upper limit, in order to cool the battery cells 22 for lowering their temperature below the upper limit. As indicated by arrow-headed one-dot chain lines in FIGS. 9, 11 and 13, the air within the vehicle compartment is fed through the slits 114, air inlet chamber 106, aperture 110 (air inlet sleeve 112), blower fan 31, air intake duct 108, air intake chamber 32 and gaps S (between the adjacent battery cells 22), and is discharged into the exterior of the vehicle 12 through the air exhaust chamber 36 and air exhaust duct 134. Thus, the battery cells 22 are cooled by the air flows from the vehicle compartment through the gaps S between the battery cells 22.

It will be understood from the foregoing description of the second embodiment that the air intake passage is provided by the slits 114, air inlet chamber 106, circular aperture 112, blower fan 31, air intake duct 108 and air intake chamber 32, while the slits 114 under the under-seat space 84 serve as the open end of the air intake passage. It will also be understood that an air exhaust passage is provided by the air exhaust chamber 36, air exhaust duct 134 and duct connected thereto.

In the present second embodiment, the battery casing 30 is disposed adjacent to the vehicle compartment but is substantially isolated from the vehicle compartment by the under-seat covering panel 16, and the battery cells 22 accommodated within the battery casing 30 are cooled by the air which is introduced from the vehicle compartment through the slits 114 formed through the covering panel 16. This arrangement permits significant reduction of the required length of the air intake passage (slits 114, air inlet chamber 106, circular aperture 112, blower fan 31, air intake duct 108 and air intake chamber 32), so that the resistance to the air flow through the air intake passage is accordingly reduced, resulting in an accordingly increased efficiency of cooling of the battery cells 22. Further, the slits 114 serving as the open end of the air intake passage are provided in a portion of the covering panel 16 which is opposed to the lower surface of the rear seat 78, so that the air within the vehicle compartment is introduced into the air intake chamber 32 of the battery pack 10 through the under-seat space 84 under the rear seat 78, and the slits 114. Described in detail, the under-seat space 84 is defined by and between the under-seat covering panel 16 and the lower surface of the rear seat 78, such that the under-seat space 84 communicates with the vehicle compartment through an opening 136 in the form of a generally elongate slot which is defined between the front ends of the covering panel 16 and the lower surface of the rear seat 78, so as to extend in the lateral direction of the vehicle 12. In this arrangement, the air within the vehicle compartment in front of the rear seat 78 is introduced into the air inlet chamber 106 through the opening 136, the under-seat space 84, and the slits 114 serving as the inlet of the air intake passage. Accordingly, the required lengths of the components providing the air intake passage, such as the air intake duct 108, can be shortened. Thus, the present second embodiment has substantially the same advantages as the first embodiment.

Figure 14:
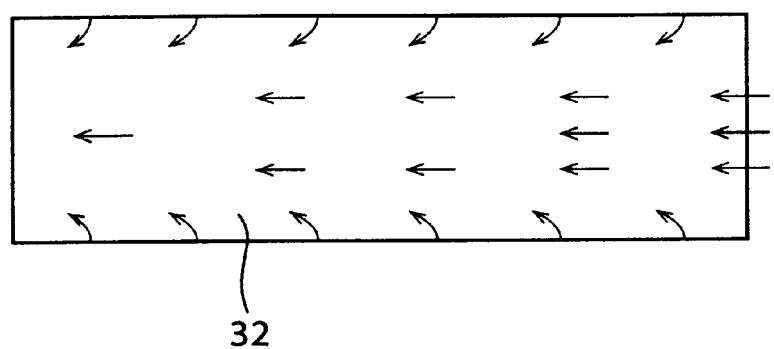
FIG. 14 is a schematic illustration for explaining air flows from the exterior of the vehicle into an air intake chamber within a battery pack in a known electric power source device.
Figure 15:
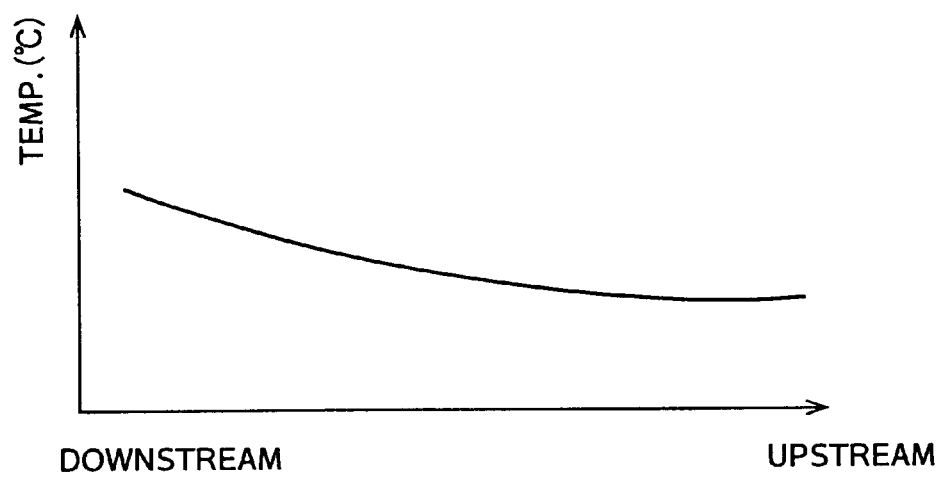
FIG. 15 is a graph indicating a change in the temperature of the air along the air stream in the conventional power source device of FIG. 14.

In the present embodiment, too, the battery module 24 is accommodated within the battery casing 30 such that the air intake chamber 32 and the air exhaust chamber 36 are formed on the opposite sides of the battery module 24, in fluid communication with each other through the gaps S between the adjacent cells 22. Since the blower fan 31 is connected to the air intake passage, the air is blown into the air intake chamber 32 through the air intake passage, by operation of the blower fan 31, and is forced to flow through the gaps S into the air exhaust chamber 36. As a result, the pressure in the air intake chamber 32 tends to be higher than the atmospheric pressure outside the battery casing 30, so that the comparatively hot air outside the battery casing 30 is prevented from entering the battery casing 30. The entry of the hot air into the battery casing 30 would cause an undesirable temperature gradient in the direction of thickness of the battery cells 22, which may cause a variation in the properties of the battery cells 22 due to the temperature gradient. The present arrangement is effective to reduce the above-indicated temperature gradient and property variation of the battery cells 22.

Where the blower fan 31 is disposed in the air exhaust passage downstream of the battery module 24, the air is drawn into the air intake chamber 32, gaps S and air exhaust chamber 36 through the air intake passage. In this case, the pressure in the air intake chamber 32 tends to be lower than the atmospheric pressure within the battery casing 30, so that the comparatively hot air of about 60° C. within the interior space 18 may be drawn into the intake air chamber 32 through gaps which may exist between the mounting walls 26e and 28e of the lower and upper cases 26, 28, and between the seating surfaces 64 of the battery cells 22 and the bearing walls 26c of the upper case 26, as indicated by oblique arrow-headed lines in FIG. 14. The entry of the comparatively hot air from the interior space 18 into the air intake chamber 32 may cause a temperature gradient within the air intake chamber 32, namely, a gradual increase of the temperature in the direction from the upstream end toward the downstream end of the air intake chamber 32, as indicated in the graph of FIG. 15, so that the local battery cells 22 have different temperatures and accordingly different properties, leading to a failure of the battery pack 10 to achieve the intended function.

Further, the power source device according to the second embodiment employs the dust-and-sound-proof cover 119 which generally covers the air inlet sleeve 110 of the blower fan 31 and which is curved to a part of the air intake passage. When the rear seat 78 is moved into its non-use position so as to expose the slits 114, foreign matters or liquids spilt within the vehicle compartment may easily enter the air inlet chamber 106 through the slits 114, together with the air. The curved cover 119 prevents such foreign matters or liquids from flowing into the blower fan 31 located downstream of the cover 119, while permitting the air to flow along the curved path. In the non-use position of the rear seat 78, the interior of the air inlet chamber 106 is visible through the slits 114, but the cover 119 conveniently hides the blower fan 31 from the passengers of the vehicle 12. The cover 119 of course functions to reduce the operating noise of the blower fan 31 as heard by the passengers.

Further, the curved distal end portion 120 of the cover 119 is effective to reduce the frictional resistance of the cover 119 to the air stream, making it possible to reduce the deceleration of the air stream due to the presence of the cover 119 in the air inlet chamber 106. Accordingly, the cooling effect of the battery pack 10 can be further increased.

Figure 16:
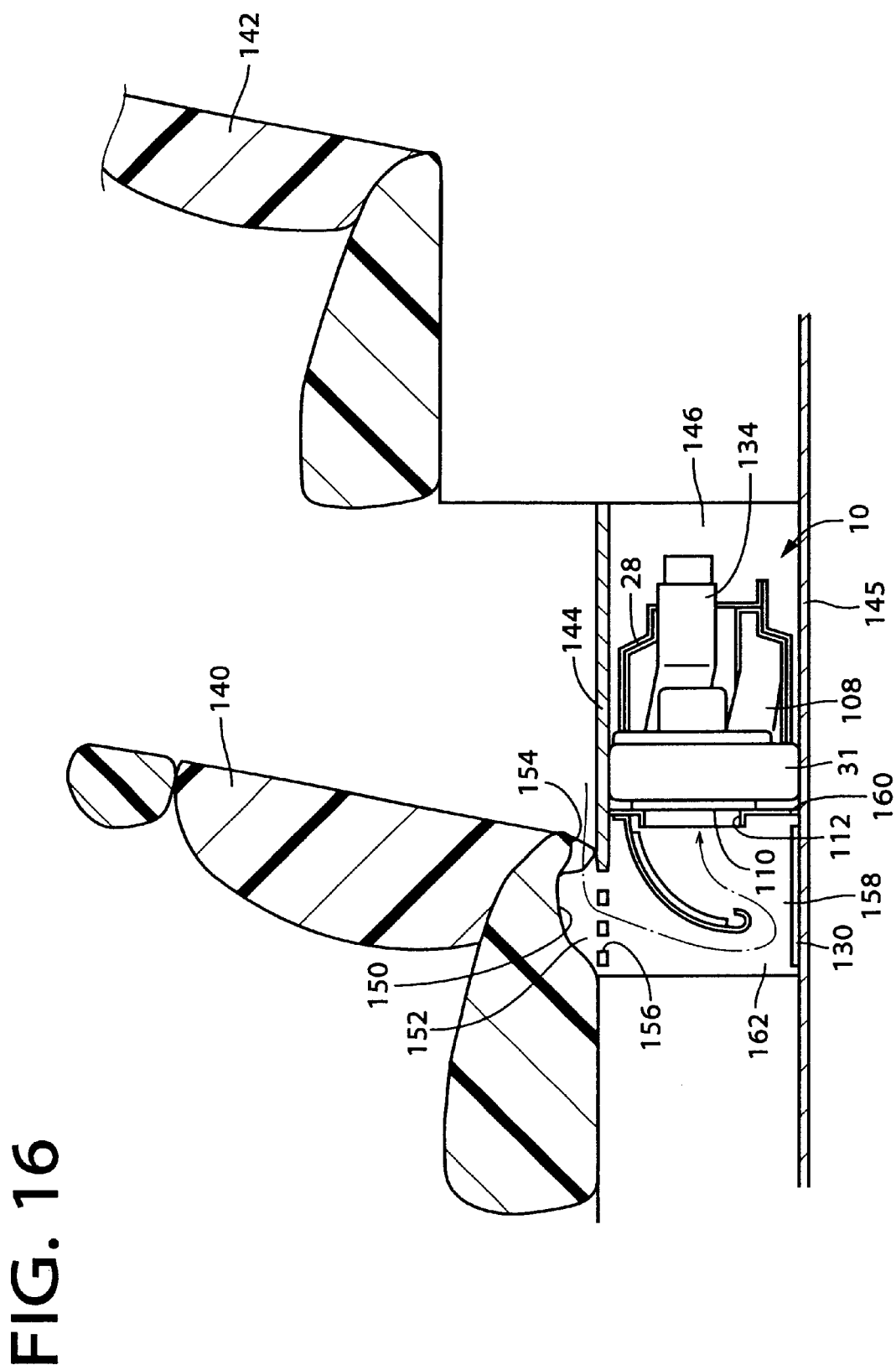
FIG. 16 is a schematic view in cross section of an automotive vehicle equipped with an electric power source device including a battery pack, which device is constructed according to a further embodiment of this invention.

Next, a third embodiment of this invention will be described. FIG. 16 is a schematic view in cross section showing an automotive vehicle equipped with an electric power source device including the battery pack 10. As shown in FIG. 16, the battery pack 10 is disposed under a floor plate 144 between a front seat 140 (first or second seat as counted from the vehicle front) and a rear seat 142 (second or third seat as counted from the vehicle front). Namely, the present power source device includes a battery chamber 146 under the floor plate 144 between the front and rear seats 140, 142. The battery chamber 146 is defined between an upper wall consisting of the floor plate 144 and a lower wall consisting of an underbody 145 of the vehicle. The battery pack 10 is accommodated within the battery chamber 146 on the underbody 145. The battery chamber 146 has a vertical dimension slightly larger than the vertical dimension of the battery pack 10. Thus, the battery pack 10 is disposed adjacent to the vehicle compartment, but is substantially isolated from the vehicle compartment by the floor plate 144.

The front seat 140 has a recess 150 formed in a rear portion of the lower surface. This recess 150 provides an under-seat space 152 between the rear portion of the lower surface of the front seat 140 and the floor plate 144. The rear end of the lower surface of the front seat 140 cooperates with the floor plate 144 to define a generally elongate opening 154 through which the under-seat space 152 is held in communication with the vehicle compartment. The floor plate 144 has a plurality of slits 156 formed through a portion thereof opposed to the rear portion of the lower surface of the front seat 140. The battery chamber 146 includes an air inlet chamber 158 which communicates with the under-seat space 152 through the slits 156. The air inlet chamber 158 is defined by a partition wall 160 parallel to the lateral direction of the vehicle and a partition wall 162 which is substantially perpendicular to the partition wall 160 and is parallel to the longitudinal direction of the vehicle. The partition wall 160 has the circular aperture 112 in which is fitted the air inlet sleeve 110 of the blower fan 31.

When the blower fan 31 is operated, the air within the vehicle compartment is fed to the battery cells 22 through the under-seat space 152, slits 156, air inlet chamber 158, circular aperture 112, blower fan 31, air intake duct 108, and air intake chamber 32 (not shown in FIG. 16). It will be understood that the intake air passage is provided by the slits 156, air inlet chamber 158, aperture 112, blower fan 31, air intake duct 108 and air intake chamber 32, while the slits 156 function as an inlet of the air intake passage.

In the third embodiment described above, too, the battery pack 10 is disposed adjacent to the vehicle compartment, but is substantially isolated from the vehicle compartment by the floor plate 144. For cooling the battery pack 10, the air within the vehicle compartment is introduced into the air inlet chamber 158 through the slits 156 formed through the floor plate 144. Accordingly, the required length of the air intake passage is significantly reduced, and the resistance to the air flow through the air intake passage is accordingly reduced, assuring an increased effect of cooling of the battery pack 10. Further, the required lengths of the components providing the air intake passage, such as the air intake duct 108, can be accordingly reduced, so that the components are available at reduced costs, and the battery pack 10 is available at a reduced cost.

In addition, the slits 156 provided under the front seat 140 are covered by the front seat 140, so that the noise due to the air flow through the air intake passage is less likely to be heard in the vehicle compartment.

While the presently preferred embodiments have been described above in detail by reference to the drawings, it is to be understood that the invention may be otherwise embodied.

For instance, the plurality of slits 96, 114, 156 serving as the inlet of the air intake passage in the illustrated embodiments may be replaced by an opening having a circular, rectangular or any other shape.

The slits 96, 114, 156 provided in the illustrated embodiments may be provided with a suitable filter such as a fabric or metallic wire filter, for preventing entry of dust and dirt into the battery pack 10 together with the air.

In the first embodiment, a dust-and-sound-proof cover similar to the cover 119 provided in the second embodiment of FIG. 9 may be provided in the air inlet chamber 92, at a position under the slits 116, so as to generally cover the opening 94.

In the first and second embodiments, the slits 96, 114 are formed in the right or left end portion of the under-seat covering panel 16 as viewed in the forward running direction of the vehicle 12, those slits 96, 114 may be formed in a longitudinally intermediate portion of the covering panel 16, to minimize the length of the air intake duct 34, 108, where the overall length of the battery pack 10 is relatively small.

While the under-seat space 84 in the first and second embodiments is formed over substantially the entire length of the lower surface of the rear seat 78 (as measured in the lateral direction of the vehicle 12), the space 84 may be formed over a portion of the entire length of the rear seat 78.

In the first and second embodiment, the under-seat space 84 is partially defined by the front end portion of the lower surface of the rear seat 78 as viewed in the longitudinal direction of the vehicle 12, the space 84 may be partially defined by the rear end portion of the lower surface of the rear seat 78. In this case, the opening for communication between the space 84 and the vehicle compartment is preferably defined by and between the rear end of the lower surface of the rear seat 78 and the rear end of the covering panel 16.

In the first and second embodiments, the battery pack 10 is disposed under the rear seat 78, more specifically, is accommodated within the interior space 18 defined by the floor panel 14 and the under-seat covering panel 16 on which the rear seat 78 rests. However, the battery pack 10 may be disposed under the front seat of the vehicle 12, provided the length of the space available under the front seat in the lateral direction of the vehicle 12 is large enough to accommodate the battery pack 10.

In the third embodiment, the battery pack 10 is disposed under the floor plate 144 between the front and rear seats 140, 142. However, the battery pack 10 may be disposed under a portion of the vehicle floor which is located on the front side of the front seat 140 or on the rear side of the rear seat 142 as viewed in the forward running direction of the vehicle.

Figure 17:
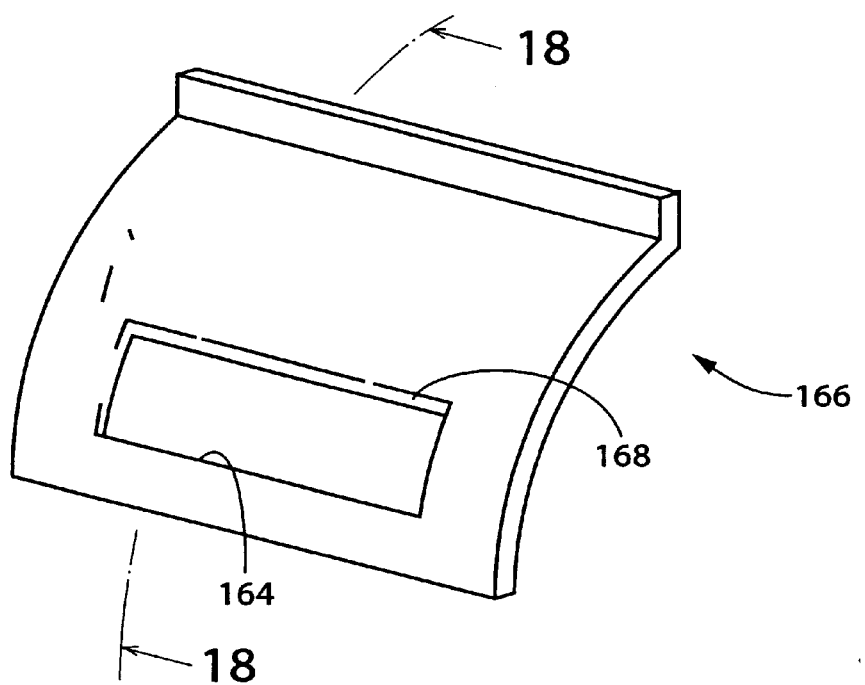
FIG. 17 is a perspective view of a dust-and-sound-proof cover which is different from that of FIG. 9.
Figure 18:
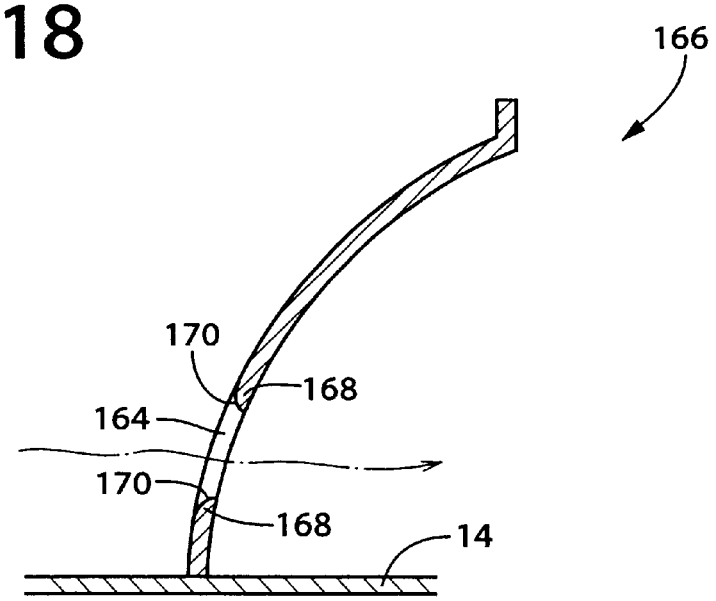
FIG. 18 is a cross sectional view taken along line 18—18 of FIG. 17.

The dust-and-sound-proof cover 119 used as the shielding plate in the second embodiment may be replaced by a dust-and-sound-proof cover 166 which has an air flow aperture 164, as shown in FIGS. 17 and 18. Since this cover 166 permits the air to flow through the air flow aperture 164, the cover 166 may be held in contact with the floor panel 14, at its distal end remote from the partition wall 104, as shown in the cross sectional view of FIG. 18 taken along line 18—18 of FIG. 17. The air flow aperture 164 is rectangular in shape and has opposite long-side edges 168 whose surfaces 170 are inclined or curved, as shown in FIG. 18, such that the dimension between the edges 168 in the direction parallel to the short sides of the rectangle of the aperture 164 is larger on the upstream side of the cover 166 than on the downstream side, namely, on the left-hand side than on the right-hand side as seen in FIG. 18.

Figure 19:
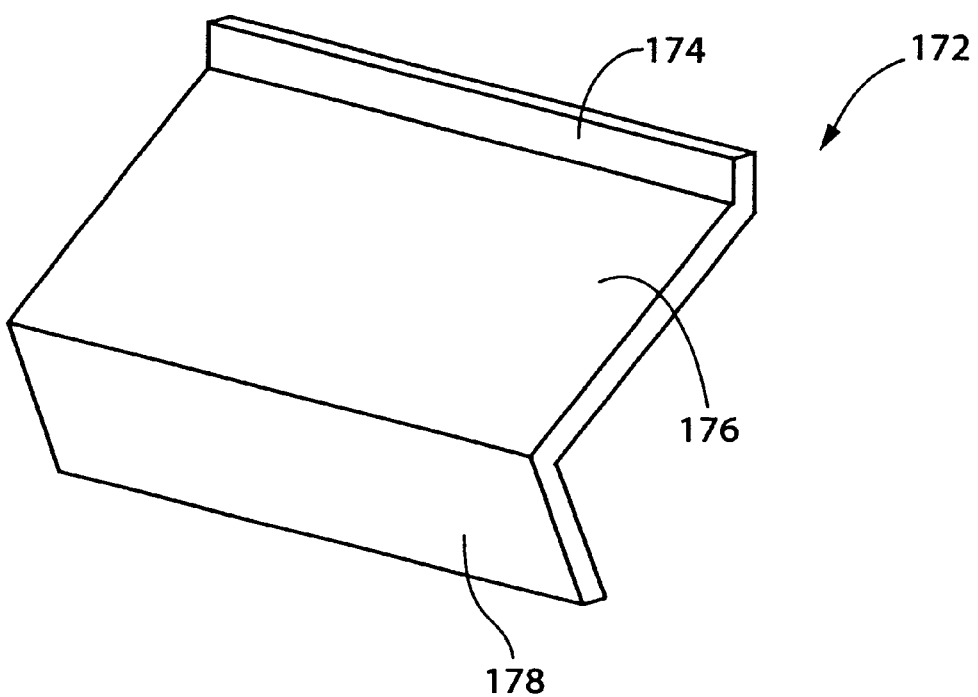
FIG. 19 is a perspective view of a shielding plate.
Figure 20:
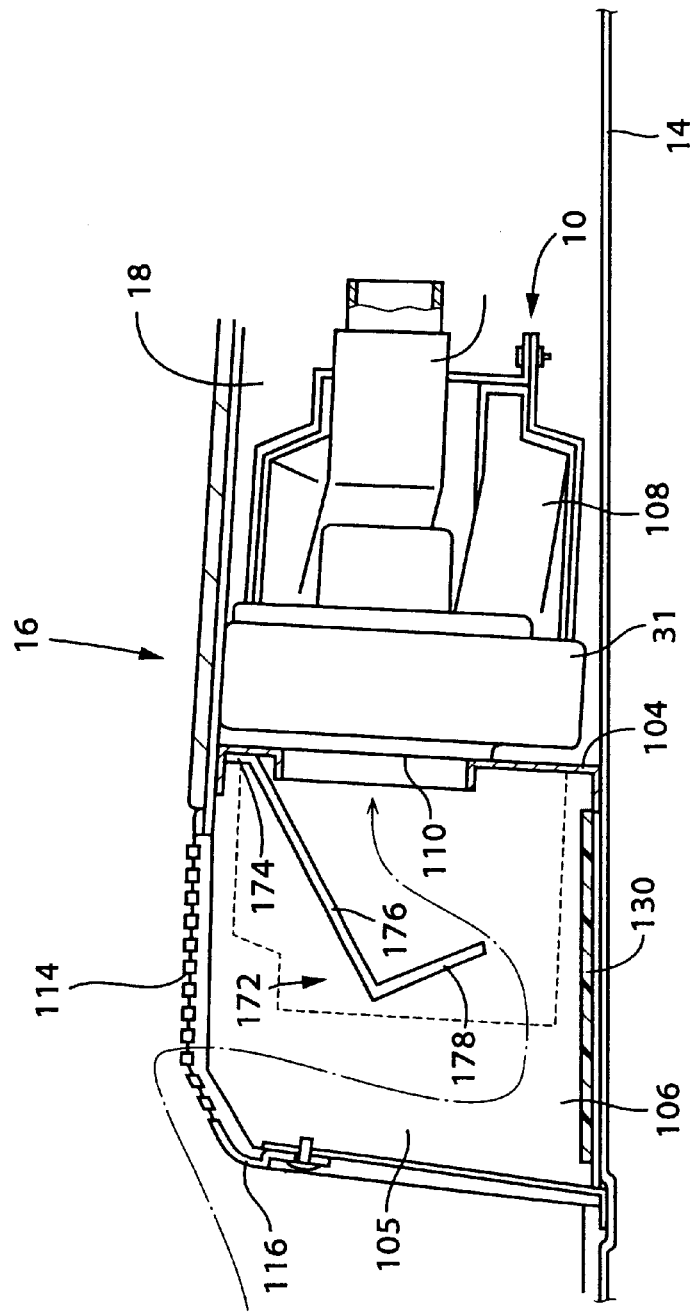
FIG. 20 is a view showing the shielding plate of FIG. 19 used in place of the dust-and-sound-proof cover of FIG. 9.

The dust-and-sound-proof cover 119 provided in the second embodiment is curved so as to approach the floor panel 14 as it extends away from the partition wall 104 and the air inlet sleeve 110 of the blower fan 31. However, the cover 119 may be replaced by any shielding plate of any suitable configuration, such as a shielding plate 172 shown in FIGS. 19 and 20, provided that the shielding plate is capable of preventing the air flow from the slits 114 directly into the blower fan 31. For instance, the shielding plate 172 shown in the perspective view of FIG. 19 may be attached, in place of the cover 119 of FIG. 9, to a portion of the partition wall 104 which is located above the air inlet sleeve 110, as shown in FIG. 20. The shielding plate 172 consists of an elongate rectangular proximal portion 174 fixed to the above-indicated portion of the partition wall 104, an upper planar portion 176 extending obliquely downwards from the lower end of the proximal portion 174 at a suitable angle relative to the proximal portion 174, and a lower planar portion 178 extending obliquely downwards from the lower end of the upper planar portion 176 at an acute angle relative to the upper planar portion 176.

In the third embodiment, the under-seat space 152 is partially defined by the recess 150 formed in the rear end portion of the lower surface of the front seat 140. However, this recess 150 is not essential. For instance, an under-seat space 152 is provided between the front seat 140 and the floor panel 144, in the absence of the recess 150, where rails are provided under the front seat 140, for permitting the front seat 140 to be slidable in the longitudinal direction of the vehicle 12.

It is to be understood that the present invention may be embodied with various other changes, modifications and improvements, such as those described in the SUMMARY OF THE INVENTION, which may occur to those skilled in the art.

What is claimed is:

1. A vehicle having an electric power source device including a plurality of battery cells accommodated within a battery casing installed on the vehicle, such that said battery cells are cooled by air introduced from a compartment of the vehicle into said battery casing, wherein:

said battery casing being disposed within a body shell of the vehicle, the body shell having a floor panel partially defining said compartment of the vehicle, and a covering panel covering said battery casing being located under a seat of the vehicle and generally isolated from said compartment by said covering panel; and said covering panel having an inlet of an air intake passage through which the air is introduced into said battery casing, for cooling said plurality of battery cells.

2. A vehicle having an electric power source device according to claim 1, wherein said air intake passage is a generally curved passage including a first straight segment extending substantially downwards from said inlet, a second straight segment extending substantially horizontally, and a curved segment which extends between said first and second straight segments, said generally curved passage being partially defined by a curved shielding plate which is fixed at a position on an inner side of a curve of said generally curved passage.

3. A vehicle having an electric power device according to claim 2, wherein said shielding plate includes a distal end portion which is turned on an inner side of a curve of said air intake passage, said inlet being located on an outer side of said curve.

4. A vehicle having an electric power source device according to claim 1, further including a blower fan which constitutes a part of said air intake passage and which is operable to blow the air into said battery casing, and a shielding plate which partially defines said air intake passage such that said air intake passage is generally curved, so as to prevent a flow of the air from said inlet of said air intake passage directly into an inlet of said blower fan.

5. A vehicle having an electric power source device according to claim 4, wherein said shielding plate includes a distal end portion which is turned on an inner side of a curve of said air intake passage, said inlet being located on an outer side of said curve.

6. A vehicle having an electric power source device including a plurality of battery cells accommodated within a battery casing installed on the vehicle, such that said battery cells are cooled by air introduced from a compartment of the vehicle into said battery casing through an intake air passage, wherein:

said battery casing being disposed within a body shell of the vehicle, the body shell having a floor panel partially defining said compartment of the vehicle, and a covering member disposed within said body shell so as to cover said battery casing being located below a seat of the vehicle and generally isolated from said compartment by said covering member; and said covering member having an inlet of said air intake passage through which the air is introduced into said battery casing.

7. A vehicle having an electric power source device according to claim 6, wherein said air intake passage is a generally curved passage including a first straight segment extending substantially downwards from said inlet, a second straight segment extending substantially horizontally, and a curved segment which extends between said first and second straight segments, said generally curved passage being partially defined by a curved shielding plate which is fixed at a position on an inner side of a curve of said generally curved passage.

8. A vehicle having an electric power source device according to claim 7, wherein said shielding plate includes a distal end portion which is turned on an inner side of a curve of said air intake passage, said inlet being located on an outer side of said curve.

9. A vehicle having an electric power source device according to claim 6, further including a blower fan which constitutes a part of said air intake passage and which is operable to blow the air into said battery casing, and a shielding plate which partially defines said air intake passage such that said air intake passage is generally curved, so as to prevent a flow of the air from said inlet of said air intake passage directly into an inlet of said blower fan.

10. A vehicle having an electric power source device according to claim 9, wherein said shielding plate includes a distal end portion which is turned on an inner side of a curve of said air intake passage, said inlet being located on an outer side of said curve.

11. A vehicle having an electric power source device including a plurality of battery cells accommodated within a battery casing installed on the vehicle, such that said battery cells are cooled by air introduced from a compartment of the vehicle into said battery casing through an intake air passage, said battery casing being disposed within a body shell of the vehicle and below a seat of the vehicle, the body shell having a floor panel partially defining said compartment, said battery casing being accommodated within an interior space having an upper wall defined by a covering panel; and said upper wall having an inlet of an air intake passage through which the air is introduced into said battery casing.

12. A vehicle having an electric power source device according to claim 11, wherein said air intake passage is a generally curved passage including a first straight segment extending substantially downwards from said inlet, a second straight segment extending substantially horizontally, and a curved segment which extends between said first and second straight segments, said generally curved passage being partially defined by a curved shielding plate which is fixed at a position on an inner side of a curve of said generally curved passage.

13. A vehicle having an electric power source device according to claim 12, wherein said shielding plate includes a distal end portion which is turned on an inner side of a curve of said air intake passage, said inlet being located on an outer side of said curve.

14. A vehicle having an electric power source device according to claim 11, further including a blower fan which constitutes a part of said air intake passage and which is operable to blow the air into said battery casing, and a shielding plate which partially defines said air intake passage such that said air intake passage is generally curved, so as prevent a flow of the air from said inlet of said air intake passage directly into an inlet of said blower fan.

15. A vehicle having an electric power source device according to claim 14, wherein said shielding plate includes a distal end portion which is turned on an inner side of a curve of said air intake passage, said inlet being located on an outer side of said curve.

16. A vehicle having an electric power source device including a battery module disposed under a seat of the vehicle and within a body shell of the vehicle, such that said battery module is cooled by air introduced through an air intake passage, said battery module consisting of a plurality of battery cells superposed on each other in a stack, wherein:

said seat having a lower surface defining an under-seat space within a compartment in the body shell of the vehicle; and said air intake passage having an inlet which is held in communication with said under-seat space, so that the air for cooling said battery module is introduced from said compartment into said air intake passage through said under-seat space and said inlet.

17. A vehicle having an electric power source device including a battery module accommodated within an interior space partially defined by an under-seat covering panel on which a seat of the vehicle is mounted, said battery module being cooled by air from said interior space which is introduced through an air intake passage, said battery module consisting of a plurality of battery cells superposed on each other in a stack, wherein:

said under-seat covering panel cooperating with a lower surface of said seat to define therebetween an under-seat space which extends in a lateral direction of the vehicle and which has an opening in the form of a generally elongate slot, said under-seat space communicating through said opening with a portion of a compartment of the vehicle, which portion is located in front of said seat; and said air intake passage having an inlet in communication with said under-seat space.

18. A vehicle having an electric power source device including a plurality of battery cells accommodated within a battery casing installed on the vehicle, such that said battery cells are cooled by air introduced from a compartment of the vehicle into said battery casing, wherein:

said battery casing being disposed in a body shell of the vehicle adjacent to said compartment of the vehicle and generally isolated from said compartment by a floor which partially defines said compartment; and said floor having an inlet of an air intake passage through which the air is introduced into said battery casing, for cooling said plurality of battery cells, wherein said inlet is provided under a seat disposed in said compartment of the vehicle.

19. A vehicle having an electric power source device including a plurality of battery cells accommodated within a battery casing installed on the vehicle, such that said battery cells are cooled by air introduced from a compartment of the vehicle into said battery casing through an intake air passage, wherein:

said battery casing being disposed in a body shell of the vehicle adjacent to said compartment of the vehicle and generally isolated from said compartment by a covering member which is disposed within the body shell of the vehicle so as to cover said battery casing; and said covering member having an inlet of said air intake passage through which the air is introduced into said battery casing, wherein said inlet is provided under a seat disposed in said compartment of the vehicle.

20. A vehicle having an electric power source device including a plurality of battery cells accommodated within a battery casing installed on the vehicle in a body shell of the vehicle, such that said battery cells are cooled by air introduced from a compartment of the vehicle into said battery casing through an intake air passage, said battery casing being accommodated within an interior space having an upper wall defined by a covering panel; and said upper wall having an inlet of the air intake passage through which the air is introduced into said battery casing, wherein said inlet is provided under a seat disposed in said compartment of the vehicle.

* * * * *